(12) United States Patent
Seki et al.

(10) Patent No.: US 10,756,392 B2
(45) Date of Patent: Aug. 25, 2020

(54) SECONDARY BATTERY, BATTERY PACK, AND VEHICLE

(71) Applicant: KABUSHIKI KAISHA TOSHIBA, Minato-ku (JP)

(72) Inventors: Hayato Seki, Kawasaki (JP); Kazuomi Yoshima, Yokohama (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 93 days.

(21) Appl. No.: 15/908,330

(22) Filed: Feb. 28, 2018

(65) Prior Publication Data

US 2019/0089011 A1 Mar. 21, 2019

(30) Foreign Application Priority Data

Sep. 20, 2017 (JP) ................... 2017-179969

(51) Int. Cl.
*H01M 10/38* (2006.01)
*H01M 2/10* (2006.01)
(Continued)

(52) U.S. Cl.
CPC ............. *H01M 10/38* (2013.01); *B60L 58/10* (2019.02); *H01M 2/1077* (2013.01);
(Continued)

(58) Field of Classification Search
CPC .................................................... H01M 10/38
See application file for complete search history.

(56) References Cited

U.S. PATENT DOCUMENTS

2002/0197536 A1* 12/2002 Mori ................. H01M 2/145
429/309
2003/0190529 A1* 10/2003 Kim ................... H01M 10/052
429/307

(Continued)

FOREIGN PATENT DOCUMENTS

EP 2 814 104 A1 12/2014
JP 5218406 6/2013
(Continued)

OTHER PUBLICATIONS definitions15908330 (Year: 2020).*
(Continued)

*Primary Examiner* — Brian R Ohara
(74) *Attorney, Agent, or Firm* — Oblon, McClelland, Maier & Neustadt, L.L.P.

(57) ABSTRACT

According to one embodiment, a secondary battery is provided. The secondary battery includes a negative electrode, a positive electrode, a first aqueous electrolyte, a second aqueous electrolyte, and a partition having a first surface and a second surface opposite to the first surface. The partition is positioned between the negative electrode and the positive electrode. The first aqueous electrolyte is in contact with the first surface of the partition and the negative electrode. The second aqueous electrolyte is in contact with the second surface of the partition and the positive electrode. The partition contains a solid electrolyte having alkali metal ion conductivity. The first aqueous electrolyte includes an organic compound.

13 Claims, 7 Drawing Sheets

(51) Int. Cl.
  *H01M 10/42* (2006.01)
  *B60L 58/10* (2019.01)
  *B60L 7/16* (2006.01)

(52) U.S. Cl.
  CPC ............ *H01M 10/425* (2013.01); *B60L 7/16* (2013.01); *H01M 2220/20* (2013.01); *H01M 2300/0002* (2013.01); *H01M 2300/0065* (2013.01); *H01M 2300/0082* (2013.01); *H01M 2300/0088* (2013.01)

(56) References Cited

U.S. PATENT DOCUMENTS

| | | | |
|---|---|---|---|
| 2007/0221265 A1* | 9/2007 | Affinito | H01M 4/02 136/243 |
| 2007/0231693 A1* | 10/2007 | Inagaki | H01M 4/485 429/231.1 |
| 2009/0189567 A1* | 7/2009 | Joshi | H01M 10/36 320/127 |
| 2010/0136427 A1 | 6/2010 | Kondo et al. | |
| 2012/0208062 A1 | 8/2012 | Zhou et al. | |
| 2012/0264025 A1* | 10/2012 | Suto | H01M 6/04 429/405 |
| 2012/0308882 A1* | 12/2012 | Ito | H01M 10/0569 429/200 |
| 2013/0189574 A1 | 7/2013 | Crepel et al. | |
| 2014/0356731 A1 | 12/2014 | Niwa et al. | |
| 2017/0077551 A1 | 3/2017 | Kishi et al. | |
| 2018/0083321 A1 | 3/2018 | Hotta et al. | |
| 2018/0277813 A1 | 9/2018 | Yoshima et al. | |
| 2018/0277899 A1 | 9/2018 | Takami et al. | |
| 2019/0088999 A1 | 3/2019 | Sekiguchi et al. | |

FOREIGN PATENT DOCUMENTS

| | | |
|---|---|---|
| JP | 5414075 | 2/2014 |
| JP | 2016-42419 | 3/2016 |
| JP | 5905470 | 4/2016 |
| JP | 2017-59393 A | 3/2017 |
| JP | 2018-45966 | 3/2018 |
| JP | 2018-160342 A | 10/2018 |
| JP | 2018-160443 A | 10/2018 |
| JP | 2019-57388 A | 4/2019 |
| WO | WO 2013/108309 A1 | 7/2013 |
| WO | WO 2016/114141 A1 | 7/2016 |

OTHER PUBLICATIONS

S. Liu, et al. "Rechargeable Aqueous Lithium-Ion Battery of $TiO_2$/$LiMn_2O_4$ with a High Voltage", Journal of The Electrochemical Society, 158(12) A1490-A1497, 2011, 8 pages.

* cited by examiner

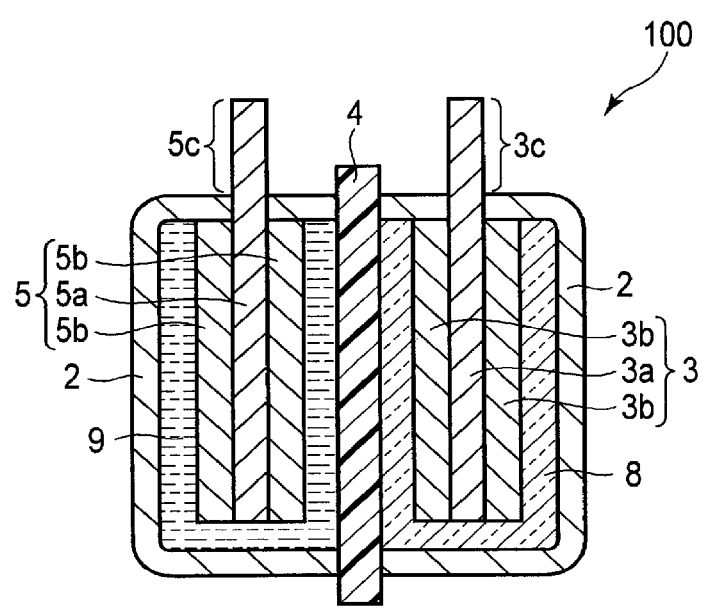
F I G. 1

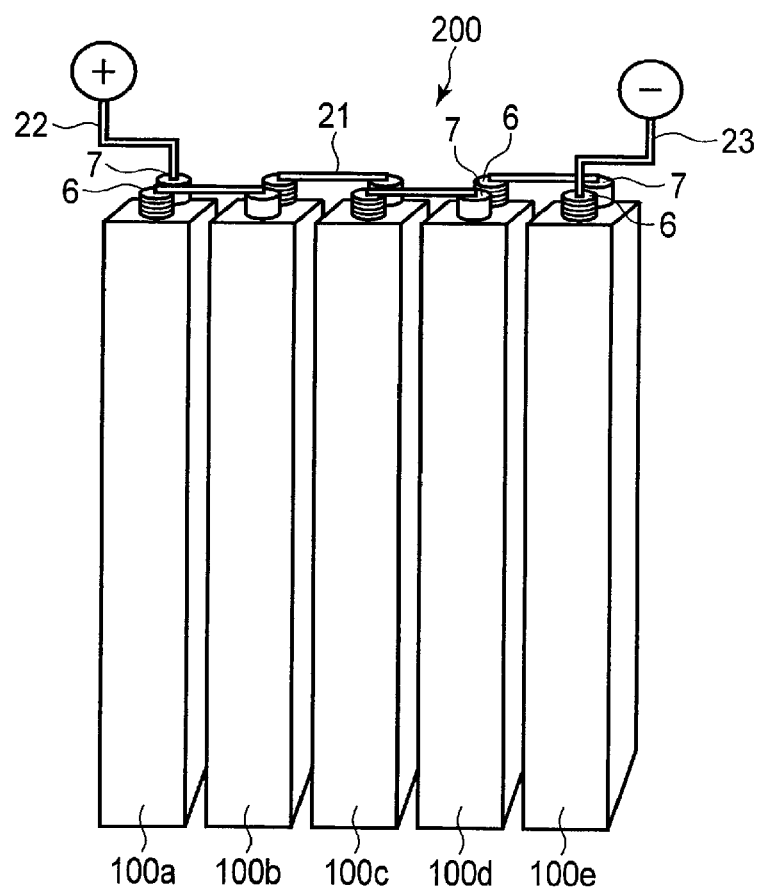
F I G. 5

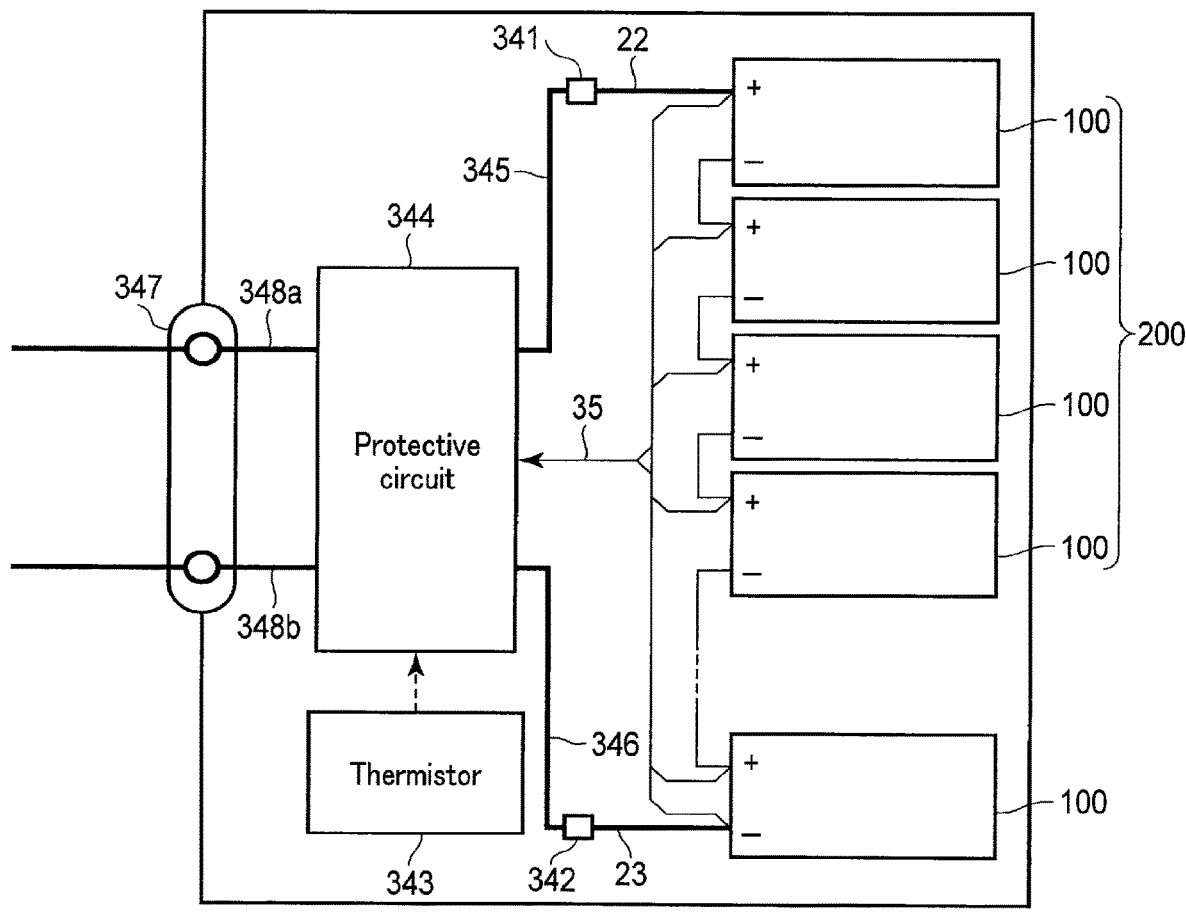
F I G. 7
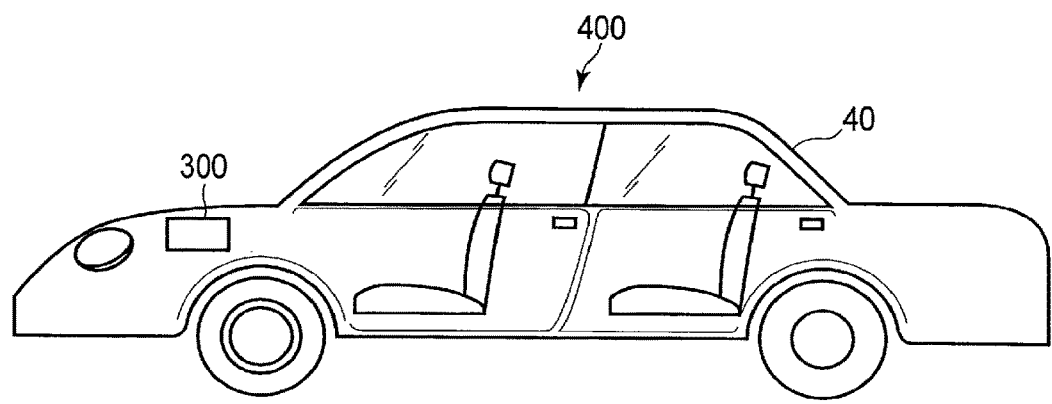
F I G. 8

SECONDARY BATTERY, BATTERY PACK, AND VEHICLE

CROSS-REFERENCE TO RELATED APPLICATION

This application is based upon and claims the benefit of priority from Japanese Patent Application No. 2017-179969, filed Sep. 20, 2017, the entire contents of which are incorporated herein by reference.

FIELD

Embodiments described herein relate generally to a secondary battery, a battery pack, and a vehicle.

BACKGROUND

A nonaqueous electrolyte battery formed by using a carbon material or a lithium titanium oxide as a negative electrode active material and a layered oxide that contains nickel, cobalt or manganese as a positive electrode active material, particularly a lithium secondary battery has already been in practical use as a power source in a wide range of fields. Such a nonaqueous electrolyte battery is provided in a variety of forms, such as small-sized batteries for various electronic devices and large-sized batteries for electric vehicles. As an electrolyte solution of the lithium secondary battery, a nonaqueous organic solvent prepared by mixing ethylene carbonate, methylethyl carbonate and the like is used, different from a nickel-hydrogen battery or a lead storage battery. An electrolyte solution prepared using the solvent has a high oxidation resistance and a high reduction resistant property compared to those of an aqueous electrolyte solution, whereby electrolysis of the solvent hardly occurs. Thus, in the case of a nonaqueous lithium secondary battery, a high electromotive force of from 2 V to 4.5 V is attained.

Meanwhile, many organic solvents are flammable substances. Accordingly, the safety of a secondary battery formed by using an organic solvent is theoretically inferior to that of a secondary battery formed by using an aqueous solution. In order to improve the safety of a lithium secondary battery formed by using an electrolyte solution containing an organic solvent, various countermeasures have been made, however it is not exactly sufficient. In the production process of the nonaqueous lithium secondary battery, a dry environment is necessary, thereby inevitably increasing the production cost. In addition, the electrolyte solution containing an organic solvent is inferior in electrical conductivity, whereby an internal resistance of the nonaqueous lithium secondary battery is easily increased. Such problems cause large defects of electric vehicles or hybrid electric vehicles and large-sized storage batteries for stationary energy storage, where emphasis is on the battery safety and cost.

In order to solve these problems, a process of converting an electrolyte solution to an aqueous solution has been examined. In the case of the aqueous electrolyte solution, it is necessary that the potential range to perform charge/discharge of a battery is set to the potential range which does not causes an electrolysis reaction of water contained as a solvent. The electrolysis of water can be avoided by using, for example, a lithium manganese oxide as the positive electrode active material and a lithium vanadium oxide as the negative electrode active material. Although the combination of these materials results in an electromotive force of from 1 to 1.5 V, an energy density sufficient as a battery is hardly obtained.

A lithium manganese oxide is used as the positive electrode active material and a lithium titanium oxide such as $LiTi_2O_4$ or $Li_4Ti_5O_{12}$ is used as the negative electrode active material so that an electromotive force of from 2.6 to 2.7 V can be theoretically obtained. From the viewpoint of energy density, an attractive battery can be produced. A nonaqueous lithium secondary battery formed by using a combination of the positive and negative electrode materials exhibits an excellent life performance. Such a battery has already been in practical use. However, in the aqueous electrolyte solution, the lithium titanium oxide has a lithium insertion/extraction potential of about 1.5 V (vs. $Li/Li^+$) based on lithium potential, whereby electrolysis is easily caused. Particularly, in a negative electrode, hydrogen is intensely generated by electrolysis on the surface of a metal outer can electrically connected to a negative electrode current collector or the negative electrode. The influence causes the active material to be easily peeled from the current collector. Consequently, such a battery does not operate stably, whereby it is not possible to perform a satisfactory charge-discharge cycle.

BRIEF DESCRIPTION OF THE DRAWINGS

FIG. 1 is a sectional view schematically showing an example of a secondary battery according to the first embodiment;

FIG. 5 is a perspective view schematically showing an example of a battery module according to the first embodiment;

FIG. 7 is a block diagram showing an example of an electric circuit of the battery pack shown in FIG. 6;

FIG. 8 is a sectional view schematically showing an example of a vehicle according to the third embodiment.

DETAILED DESCRIPTION

Figure 2:
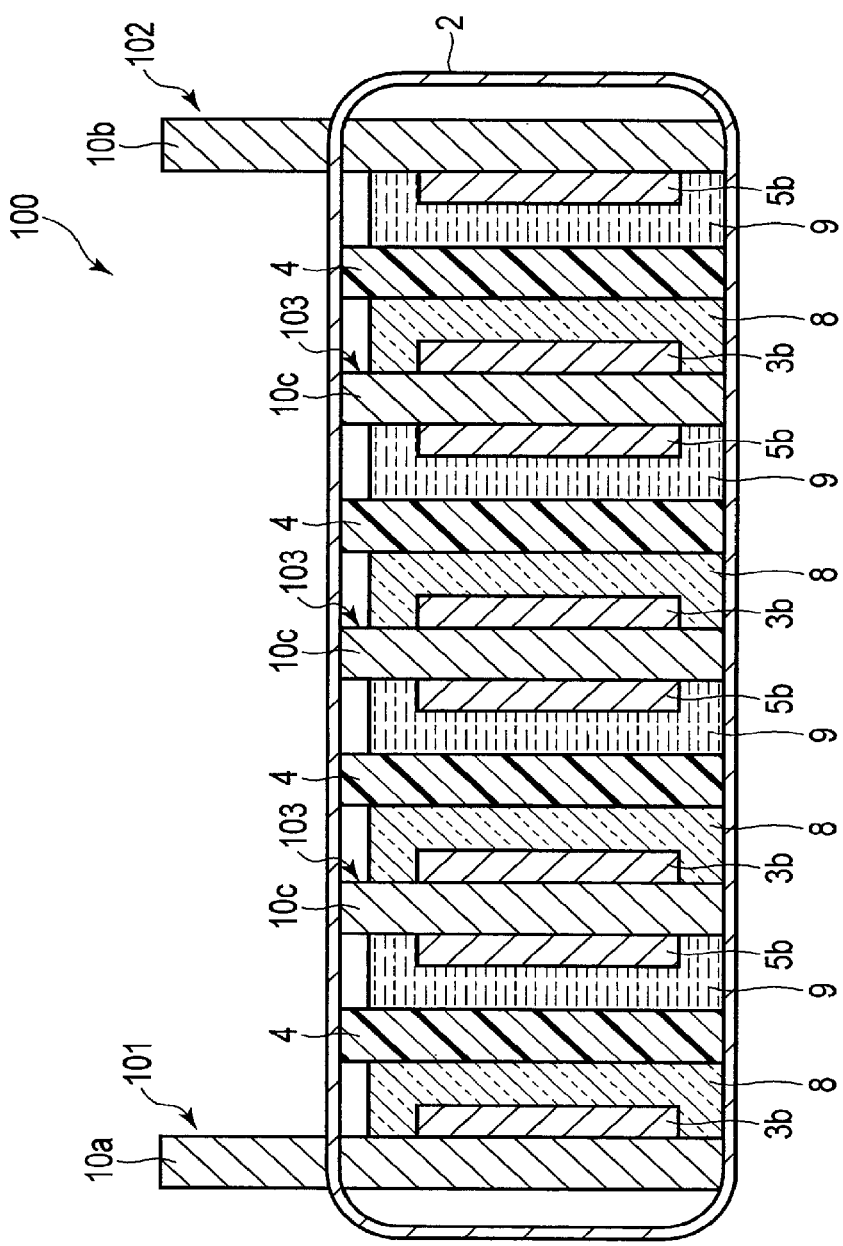
FIG. 2 is a sectional view schematically showing another example of the secondary battery according to the first embodiment.

According to a first embodiment, a secondary battery is provided. The secondary battery includes a negative electrode, a positive electrode, a first aqueous electrolyte, a second aqueous electrolyte, and a partition having a first surface and a second surface opposite to the first surface. The partition is positioned between the negative electrode and the positive electrode. The first aqueous electrolyte is in contact with the first surface of the partition and the negative electrode. The second aqueous electrolyte is in contact with the second surface of the partition and the positive electrode. The partition contains a solid electrolyte having alkali metal ion conductivity. The first aqueous electrolyte includes an organic compound.

According to a second embodiment, a battery pack is provided. The battery pack includes the secondary battery according to the first embodiment.

According to a third embodiment, a vehicle is provided. The vehicle includes the battery pack according to the second embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to the first embodiment, a secondary battery is provided. The secondary battery includes a negative electrode, a positive electrode, a first aqueous electrolyte, a second aqueous electrolyte, and a partition having a first surface and a second surface opposite to the first surface. The partition is positioned between the negative electrode and the positive electrode. The first aqueous electrolyte is in contact with the first surface of the partition and the negative electrode. The second aqueous electrolyte is in contact with the second surface of the partition and the positive electrode. The partition contains a solid electrolyte having alkali metal ion conductivity. The first aqueous electrolyte includes an organic compound.

In the negative electrode of the secondary battery including the aqueous electrolyte, electrolysis of water readily occurs due to low hydrogen overvoltage. The electrolysis of water is represented by Formula 1 below.

$$2H_2O \rightarrow H_2 + 2OH^- \quad (1)$$

In order to make it difficult for the reaction of Formula (1) to proceed to the right, it is conceivable to increase pH of, for example, the aqueous electrolyte on the negative electrode side.

On the other hand, when the electrolysis of water occurs in the positive electrode, oxygen is generated. Since generation of oxygen is caused by hydroxide ion ($OH^-$) passing electrons in the positive electrode, the amount of $OH^-$ ions contained in the aqueous electrolyte on the positive electrode side is preferably small. That is, the generation of oxygen can be suppressed by reducing pH in the aqueous electrolyte on the positive electrode side, thereby improving charge-and-discharge efficiency.

As described above, the aqueous electrolyte on the negative electrode side and the aqueous electrolyte on the positive electrode side preferably have different compositions. Therefore, a partition containing a solid electrolyte may be used for the purpose of using different electrolytes in the aqueous electrolyte on the negative electrode side and the aqueous electrolyte on the positive electrode side.

The inventors of the present application found that when a partition containing a solid electrolyte was used and pH of an aqueous electrolyte on a negative electrode side was increased for the purpose of suppressing electrolysis of water, the solid electrolyte was corroded by hydroxide ion ($OH^-$) and battery characteristics were deteriorated.

In the secondary battery according to the embodiment, an organic compound is contained in the aqueous electrolyte on the negative electrode side. In this case, since the concentration of water in the aqueous electrolyte on the negative electrode side is lowered, electrolysis of water is suppressed. In addition, since the ion conductivity of the aqueous electrolyte on the negative electrode side is lowered by the addition of the organic compound, the frequency at which hydroxide ions approach the surface of the solid electrolyte decreases and thus the corrosion of the solid electrolyte is suppressed. As a result, according to the secondary battery of the embodiment, cycle life characteristic and storage performance are improved.

The secondary battery according to the embodiment will be described in detail.

The secondary battery includes a negative electrode, a positive electrode, and a partition positioned between the negative electrode and the positive electrode. The negative electrode, the positive electrode, and the partition can constitute an electrode group. The secondary battery can further include a container member which is configured to store the electrode group and the aqueous electrolyte. In addition, the secondary battery can further include a negative electrode terminal electrically connected to the negative electrode and a positive electrode terminal electrically connected to the positive electrode.

Hereinafter, the aqueous electrolyte, the negative electrode, the positive electrode, the partition, the container member, the negative electrode terminal, and the positive electrode terminal will be described in detail.

(1) Aqueous Electrolyte

The aqueous electrolyte includes a first aqueous electrolyte and a second aqueous electrolyte. Although the aqueous electrolyte is described below, the description of the aqueous electrolyte is independently applied to the first aqueous electrolyte and the second aqueous electrolyte, unless otherwise specified.

The aqueous electrolyte contains, for example, a solvent containing water and alkali metal salt as electrolyte salt. The alkali metal salt is, for example, lithium salt or sodium salt. The aqueous electrolyte is, for example, an aqueous electrolytic solution containing lithium ions or sodium ions. The aqueous electrolyte may contain both lithium ions and sodium ions. The aqueous electrolyte may be a gel aqueous electrolyte prepared by compositing an aqueous electrolytic solution and a polymeric material. Examples of the polymeric material include polyvinylidene fluoride (PVdF), polyacrylonitrile (PAN), and polyethylene oxide (PEO).

The solvent containing water may be pure water, or may be a mixed solution and/or a mixed solvent of water and a material other than water.

The aqueous electrolyte preferably contains 1 mol or more of water with respect to 1 mol of electrolyte salt that is a solute. The amount of the water with respect to 1 mol of electrolyte salt is preferably 3.5 mol or more.

That the aqueous electrolyte contains water can be confirmed by GC-MS (Gas Chromatography-Mass Spectrometry). In addition, the salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

The aqueous electrolyte is prepared by, for example, dissolving electrolyte salt in a solvent containing water at a concentration of 1 to 12 mol/L. The concentration of the alkali metal ions in the aqueous electrolyte is preferably 6 M (mol/L) or more. This makes it possible to suppress electrolysis of water in the negative electrode and reduce generation of hydrogen from the negative electrode. The concentration more preferably ranges from 6 M to 10 M.

Examples of the lithium salt include LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFSI: lithium bis(fluorosulfonyl)imide), and $LiB[(OCO)_2]_2$ (LiBOB: lithium bis(oxalate)borate). The kind of the lithium salt used may be one kind or two or more kinds. In addition, the aqueous electrolyte may contain a salt other than lithium salt. An example of the salt other than lithium salt is $znSO_4$.

Examples of the sodium salt include NaCl, $Na_2SO_4$, NaOH, $NaNO_3$, NaTFSA (sodium trifluoromethanesulfonylamide), and the like. The kind of the sodium salt used may be one kind or two or more kinds.

The aqueous electrolyte preferably contains an least one anionic species selected from the group consisting of a chloride ion ($Cl^-$), a hydroxide ion ($OH^-$), a sulfate ion ($SO_4^{2-}$), and a nitrate ion ($NO_3^-$). These anionic species are, for example, anions derived from alkali metal salt.

The first aqueous electrolyte and the second aqueous electrolyte are separated by, for example, the partition. As will be described later in detail, the partition has, for example, a sheet shape in which the area of the first surface and the area of the second surface positioned on the side opposite to the first surface are significantly larger than the area of the other surfaces.

The first aqueous electrolyte is in contact with the first surface of the partition and the negative electrode. The second aqueous electrolyte is in contact with the second surface of the partition and the positive electrode.

The first aqueous electrolyte and the second aqueous electrolyte are preferably different in pH.

pH of the first aqueous electrolyte is preferably within a range of 6 to 14, and more preferably 10 to 14. When pH of the first aqueous electrolyte is within this range, generation of hydrogen in the negative electrode is easy to suppress, and the corrosion of the partition is easily suppressed.

pH of the second aqueous electrolyte is preferably within a range of 2 to 7, and more preferably 4 to 7. When pH of the second aqueous electrolyte is within this range, a positive electrode active material is difficult to dissolve and generation of oxygen can be suppressed.

pH of the aqueous electrolyte can be adjusted by, for example, a reagent such as HCl, $H_2SO_4$, LiOH, NaOH, KOH, or tetraethylamine hydroxide solution.

The first aqueous electrolyte includes one kind or two or more kinds of organic compound(s). The second aqueous electrolyte may include one kind or two or more kinds of organic compound(s), or may not include organic compounds. In a case in which the second aqueous electrolyte contains the organic compound, the organic compound included in the first aqueous electrolyte may be identical to or different from the organic compound included in the second aqueous electrolyte. The organic compounds will be described later.

When the first aqueous electrolyte contains the organic compound, the concentration of water in the first aqueous electrolyte is lowered, and thus electrolysis of water in the negative electrode is suppressed. In addition, since the ion conductivity of the first aqueous electrolyte is lowered, corrosion of the solid electrolyte included in the partition is suppressed. Therefore, cycle life characteristic and storage performance of the secondary battery are improved.

The molar concentration of the organic compound contained in the first aqueous electrolyte is within a range of, for example, 0.01 mol/L to 5 mol/L, and preferably 0.1 mol/L to 3 mol/L.

The molar concentration of water contained in the first aqueous electrolyte is within a range of, for example, 20 mol/L to 50 mol/L, and preferably 30 mol/L to 45 mol/L.

In the first aqueous electrolyte, a ratio M1 of the molar concentration of the organic compound to the molar concentration of water is within a range of, for example, 0.0001 to 0.5, and preferably 0.001 to 0.1. When the ratio M1 is within this range, both the high cycle retention rate and the high output characteristic can be compatible. When the ratio M1 is excessively high, the ion conductivity of the first aqueous electrolyte is low, and thus the rate performance is deteriorated. In addition, there is a possibility that the effect of suppressing the corrosion of the solid electrolyte will not be sufficiently obtained. When the ratio M1 is excessively low, there is a possibility that hydrogen will be generated intensely in the negative electrode.

From the viewpoint of increasing the charge-and-discharge efficiency, pH of the second aqueous electrolyte is preferably lower as described above. However, since many materials constituting the partition are relatively resistant to the acidic condition, it is difficult to obtain the effect of suppressing the corrosion of the partition by adding the organic compound to the second aqueous electrolyte. Rather, when the second aqueous electrolyte contains the organic compound, there is a problem that ion conductivity is lowered and the organic compound is oxidized, as compared with a case in which the second aqueous electrolyte does not contain the organic compound. In a case in which the organic compound added to the second aqueous electrolyte is oxidized, compounds produced by the oxidization of the organic compound cannot be dissolved in the electrolyte and may float on the electrolyte as a solid matter, and thus ion conductivity may be lowered. In addition, since the organic compound reacts with a current collector during oxidation and corrosion of the current collector progresses, a resistance value may increase. Therefore, it is preferable that the second aqueous electrolyte does not contain the organic compound.

The molar concentration of the organic compound contained in the second aqueous electrolyte is within a range of, for example, 0 mol/L to 2 mol/L, and preferably 0 mol/L to 1.5 mol/L.

The molar concentration of water contained in the second aqueous electrolyte is within a range of, for example, 30 mol/L to 56 mol/L, and preferably 35 mol/L to 56 mol/L.

In the second aqueous electrolyte, a ratio M2 of the molar concentration of the organic compound to the molar concentration of water is within a range of, for example, 0 to 0.1, and preferably 0 to 0.05. The ratio M2 may be zero. When the ratio M2 is within this range, it is possible to prevent elution of the positive electrode active material having a weak resistance to acid without lowering ion conductivity.

When the second aqueous electrolyte contains the organic compound, the ratio M1 of the molar concentration of the organic compound to the molar concentration of water in the first aqueous electrolyte is preferably higher than the ratio M2 of the molar concentration of the organic compound to the molar concentration of water in the second aqueous electrolyte. In this manner, it is possible to suppress generation of hydrogen in the negative electrode while maintaining high output characteristic and suppress corrosion of the partition containing the solid electrolyte.

A ratio M2/M1 of the ratio M2 to the ratio M1 is, for example, 1,000 or less, and preferably 500 or less. When the ratio M2/M1 is excessively high, the corrosion of the partition containing the solid electrolyte cannot be suppressed and the cycle characteristic tends to be low.

The organic compound contained in the aqueous electrolyte is an organic compound that is capable of lowering the molar concentration of water per unit volume of the aqueous electrolyte.

It is preferable that the organic compound is not alkali metal salt contained as electrolyte salt. It is preferable that the organic compound is not an organic ion derived from alkali metal salt contained as electrolyte salt. That is, the alkali metal salt and the organic ion derived from the alkali metal salt are excluded from the organic compound.

Whether the organic compound contained in the aqueous electrolyte is the organic ion derived from the alkali metal salt can be determined by Inductively Coupled Plasma (ICP) analysis. The molar concentration of alkali metal ions contained in the target aqueous electrolyte and the molar concentration of organic ions contained in the corresponding aqueous electrolyte are clarified by the ICP analysis, and by comparing these molar concentrations, whether the organic compound contained in the aqueous electrolyte is the organic ion derived from the alkali metal salt can be determined.

The organic compound contained in the aqueous electrolyte is, for example, at least one selected from the group consisting of nitrogen compounds typified by N-methyl-2-pyrrolidone (NMP), succinimide, acetonitrile, methylamine, 2-amino-methylpropane, propyl amine, dimethyl amine, diethylamine, trimethylamine, triphenylamine, acetamide, N-methylacetamide, dimethylacetamide, dimethylformamide, and butyramide and derivatives of the nitrogen compounds, alcohol ether compounds typified by methanol, ethanol, propanol, isopropanol, butanol, isobutyl alcohol, ethylene glycol, and dimethyl ether and derivatives thereof, and carbonyl compounds typified by acetone, 2-butanone, heptanone, cyclohexanone, formaldehyde, acetaldehyde, propanard, acetophenone, and benzaldehyde and derivatives of the alcohol ether compounds.

As described above, since the first aqueous electrolyte that exists in the negative electrode side is preferably basic, it is preferable that the organic compound contained in the first aqueous electrolyte (also referred to as a first organic compound) is hardly reduced.

The first organic compound contained in the first aqueous electrolyte is preferably, for example, at least one selected from the group consisting of nitrogen compounds typified by N-methyl-2-pyrrolidone (NMP), succinimide, acetonitrile, methylamine, 2-amino-methylpropane, propyl amine, dimethylamine, diethylamine, trimethylamine, triphenylamine, acetamide, N-methylacetamide, dimethylacetamide, dimethylformamide, and butyramide and derivatives of the nitrogen compounds, and alcohol ether compounds typified by methanol, ethanol, propanol, isopropanol, butanol, isobutyl alcohol, ethylene glycol, and dimethyl ether and derivatives of the alcohol ether compounds.

In addition, since the second aqueous electrolyte exists in the positive electrode side is preferably acidic, it is preferable that the organic compound contained in the second aqueous electrolyte (also referred to as a second organic compound) is hardly oxidized.

The second organic compound contained in the second aqueous electrolyte is preferably, for example, at least one selected from the group consisting of carbonyl compounds typified by acetone, 2-butanone, heptanone, cyclohexanone, formaldehyde, acetaldehyde, propanal, acetophenone, and benzaldehyde and derivatives of the carbonyl compounds.

The first aqueous electrolyte may contain a polymeric material for gelling, distinguished from the first organic compound. The second aqueous electrolyte may contain a polymeric material for gelling, distinguished from the second organic compound.

The composition of the aqueous electrolyte can be analyzed by Fourier Transform Infrared Spectroscopy (FT/IR).

Specifically, for example, the volume fraction of water and the organic compound can be measured by performing structure identification with FT/IR and fractionating the electrolytic solution. From the volume fraction, the molar concentration of water and the molar concentration of the organic compound in the aqueous electrolyte can be calculated.

The volume fraction may be calculated from a ratio of peak areas of gas chromatogram analyzed by Gas Chromatography (GC) for the mixed solvent of the aqueous electrolyte and the known solvent at a volume ratio of 1:1.

At least one of the first aqueous electrolyte and the second aqueous electrolyte may be a gel aqueous electrolyte as described above. In order to manufacture a secondary battery in which at least one of the first aqueous electrolyte and the second aqueous electrolyte is the gel aqueous electrolyte, for example, after preparing the negative electrode, the first aqueous electrolyte in a gel state may be applied to the negative electrode. Alternatively, in a case in which the first aqueous electrolyte is a liquid, the second aqueous electrolyte in a gel state may be applied to the positive electrode. The applying of the gel aqueous electrolyte can be performed by, for example, immersing the positive electrode or the negative electrode in the gel aqueous electrolyte. An example of a secondary battery in a case in which a first aqueous electrolyte is in a gel state will be described later with reference to FIGS. 3 and 4.

(2) Negative Electrode

The negative electrode active material-containing layer is provided on at least one surface of a negative electrode current collector. For example, the negative electrode active material-containing layer may be provided on one surface of the negative electrode current collector, and the negative electrode active material-containing layer may be provided on one surface of the negative electrode current collector and the rear surface thereof.

The negative electrode current collector is preferably aluminum foil or aluminum alloy foil containing at least one element selected from Mg, Ti, Zn, Ni, Mn, Fe, Cu, and Si. The aluminum alloy foil may contain only one of these elements or two or more elements. The negative electrode current collector may be in other forms such as a porous body or a mesh.

The negative electrode current collector can include a portion on the surface of which the negative electrode active material-containing layer is not formed. This portion can act as a negative electrode current collector tab.

The thickness of the negative electrode current collector is, for example, 10 µm to 500 µm. If the thickness is less than 10 µm, tearing during the manufacture occurs at a high possibility. If the thickness exceeds 500 µm, the volume energy density of the battery may lower. The thickness of the negative electrode current collector is preferably 20 µm or less, and more preferably 15 µm or less.

The density of the negative electrode active material-containing layer (not including the current collector) is preferably 1.8 $g/cm^3$ to 2.8 $g/cm^3$. The negative electrode, in which the density of the negative electrode active material-containing layer is within this range, is excellent in terms of energy density and holding property of the aqueous electrolyte. The density of the negative electrode active material-containing layer is preferably 2.1 g/cm$^3$ to 2.6 g/cm$^3$.

Examples of the negative electrode active material include at least one of titanium-containing oxides such as titanium oxide, lithium titanium oxide, niobium titanium oxide, and sodium niobium titanium oxide. The Li insertion potential of the titanium-containing oxide preferably ranges from 1.2 V (vs. Li/Li$^+$) to 2.0 V (vs. Li/Li$^+$). The negative electrode active material can include one of the titanium-containing oxides or two or more of the titanium-containing oxides.

Examples of the titanium oxide include a titanium oxide having a monoclinic structure, a titanium oxide having a rutile structure, and a titanium oxide having an anatase structure. As for the titanium oxide having each of the crystal structures, the composition before charge is TiO$_2$ and the composition after charge is Li$_x$TiO$_2$ (x is 0≤x≤1). Further, the structure of the titanium oxide having a monoclinic structure before charge is TiO$_2$ (B).

Examples of the lithium titanium oxides include, for example, a lithium titanium oxide having a spinel structure (e.g. the general formula of Li$_{4+x}$Ti$_5$O$_{12}$ (−1≤x≤3)), an orthorhombic titanium oxide (e.g. the general formula of Li$_{2+a}$M(I)$_{2-b}$Ti$_{6-c}$M(II)$_d$O$_{14+\sigma}$ (0≤a≤6, 0<b<2, 0<c<6, 0<d<6, −0.5≤δ≤0.5, M(I) is at least one material selected from the group consisting of Sr, Ba, Ca, Mg, Na, Cs, and K, and M(II) is at least one material selected from the group consisting of Zr, Sn, V, Nb, Ta, Mo, W, Fe, Co, Mn, Al, Y), a lithium titanium oxide having a ramsdellite structure (e.g. Li$_{2+x}$Ti$_3$O$_7$ (−1≤x≤3), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), and Li$_x$TiO$_2$ (0<x≤1)). The lithium titanium oxide may be a lithium titanium composite oxide in which a dopant is introduced.

Examples of the niobium titanium oxide include a niobium titanium oxide represented by Li$_a$TiM$_b$Nb$_{2\pm\beta}$O$_{7\pm\sigma}$ (0≤a≤5, 0≤b≤0.3, 0≤β≤0.3, 0≤σ≤0.3, where M is at least one kind of elements selected from the group consisting of Fe, V, Mo, and Ta).

Examples of the sodium niobium titanium oxides include, for example, an orthorhombic Na-containing niobium titanium composite oxide represented by the general formula of Li$_{2+v}$Na$_{2-w}$M1$_x$Ti$_{6-y-z}$Nb$_y$M2$_z$O$_{14+\delta}$ (0≤v≤4, 0<w<2, 0≤x<2, 0<y<6, 0≤z<3, −0.5≤δ≤0.5, M1 includes at least one material selected from Cs, K, Sr, Ba, and Ca, and M2 includes at least one material selected from Zr, Sn, V, Ta, Mo, W, Fe, Co, Mn, and Al).

The negative electrode active material is preferably at least one material selected from the group consisting of a spinel-type lithium titanate (e.g. Li$_4$Ti$_5$O$_{12}$), an anatase type titanium oxide (e.g. TiO$_2$), a niobium titanium oxide, and a sodium niobium titanium oxide.

The negative electrode contains a negative electrode active material, for example, in the form of particles. Negative electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

A conductive agent is added in order to increase the current-collecting performance and suppress the contact resistance between the active material and the current collector. Examples of the conductive agent include carbonaceous materials such as carbon black such as vapor grown carbon fiber (VGCF) and acetylene black, and graphite. One of these materials may be used as the conductive agent, or two or more of these materials may be combined and used as the conductive agent. Alternatively, instead of using the conductive agent, carbon coating or electron conductive inorganic material coating may be performed on the surfaces of the active material particles. A binder is added in order to fill a gap between dispersed active materials and bind the active material and the negative electrode current collector. Examples of the binder include polytetrafluoroethylene (PTFE), polyvinylidene fluoride (PVdF), fluorine rubber, styrene butadiene rubber, polyacrylic acid compound, imide compound, carboxymethyl cellulose (CMC), and salts of the CMC. One of these materials may be used as the binder, or two or more of these materials may be combined and used as the binder.

In the compounding ratios of the negative electrode active material, the conductive agent, and binder in the negative electrode active material-containing layer, it is preferable that the negative electrode active material is in the range of 70% by mass to 95% by mass, the conductive agent is in the range of 3% by mass to 20% by mass, and the binder is in the range of 2% by mass to 10% by mass. When the compounding ratio of the conductive agent is 3% by mass or more, current-collecting performance of the negative electrode active material-containing layer can be improved. When the content of the binder is 2% by mass or more, sufficient electrode strength can be obtained, and when the content of the binder is 10% by mass or less, the insulating part of the electrode can be reduced.

The negative electrode can be produced by, for example, the following method. First, a negative electrode active material, a conductive agent, and a binder are suspended in a solvent to prepare a slurry. The slurry is applied to one side or both sides of a negative electrode current collector. Next, the applied slurry is dried to obtain a laminated body of the negative electrode active material-containing layer and the negative electrode current collector. Then, the laminated body is pressed. In this manner, a negative electrode is produced.

Alternatively, a negative electrode is produced by the following method: First, a negative electrode active material, a conductive agent, and a binder are mixed to obtain a mixture thereof. Next, the mixture is molded into a pellet form. Next, a negative electrode can be obtained by arranging these pellets on the negative electrode current collector.

(3) Positive Electrode

The positive electrode may include a positive electrode current collector and a positive electrode active material-containing layer. The positive electrode active material-containing layer may be formed on one side or both sides of the positive electrode current collector. The positive electrode active material-containing layer may include a positive electrode active material, and optionally a conductive agent and a binder.

As the positive electrode active material, for example, an oxide or sulfide can be used. The positive electrode may contain one kind of compound alone as the positive electrode active material or two kinds or more of compounds in combination. As an example of the oxide or sulfide, a compound capable of having an alkali metal or alkali metal ions to be inserted and extracted.

Examples of such compounds include manganese dioxides (MnO$_2$), iron oxides, copper oxides, nickel oxides, lithium manganese composite oxides (e.g., Li$_x$Mn$_2$O$_4$ or Li$_x$MnO$_2$; 0<x≤1), lithium nickel composite oxides (e.g., Li$_x$NiO$_2$; 0<x≤1), lithium cobalt composite oxides (e.g., Li$_x$CoO$_2$; 0<x≤1), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxide ($Li_xNi_{1-x-y}Co_xMn_yO_2$; $0<x\leq1$, $0<y<1$, $0<z<1$, $y+z<1$).

Among the above compounds, examples of more desirable compounds as the positive electrode active material include lithium manganese composite oxides having a spinel structure (e.g., $Li_xMn_2O_4$; $0<x\leq1$), lithium nickel composite oxides (e.g., $Li_xMn_2O_4$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-x-y}Co_xMn_yO_2$; $0<x\leq1$, $0<y<1$, $0<z<1$, $y+z<1$). When these compounds are used as the positive electrode active material, the positive electrode potential can be increased.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 µm. The positive electrode active material having a primary particle size of 100 nm or more is easy to handle during industrial production. In the positive electrode active material having a primary particle size of 1 µm or less, diffusion of lithium ions within solid can proceed smoothly.

The specific surface area of the positive electrode active material is preferably in the range of 0.1 m²/g to 10 m²/g. A positive electrode active material having the specific surface area of 0.1 m²/g or more can adequately secure insertion/extraction sites of lithium ions. A positive electrode active material having the specific surface area of 10 m²/g or less is easy to handle in industrial production and also can ensure charge-and-discharge cycle performance.

The binder is added to fill gaps among the dispersed positive electrode active material and also to bind the positive electrode active material with the positive electrode current collector. Examples of the binder include polytetrafluoro ethylene (PTFE), polyvinylidene fluoride (PVdF), flurorubber, polyacrylic compound, imide compound, carboxyl methyl cellulose (CMC), and CMC salt. One of these may be used as the binder or a combination of two or more may be used as the binder.

The conductive agent is added to improve a current collection performance and to suppress the contact resistance between the positive electrode active material and the positive electrode current collector. Examples of the conductive agent include carbonaceous substances such as vapor grown carbon fiber (VGCF), carbon black such as acetylene black, and graphite. One of these may be used as the conductive agent, or two or more may be used in combination as the conductive agent. The conductive agent may be omitted.

In the positive electrode active material-containing layer, the positive electrode active material and binder are preferably blended in proportions of 80% by mass to 98% by mass, and 2% by mass to 20% by mass, respectively.

By setting the amount of the binder to 2% by mass or more, sufficient electrode strength can be obtained. The binder may also function as an insulator. Thus, if the amount of the binder to 20% by mass or less, the amount of insulator contained in the electrode decreases, and thereby internal resistance can be decreased.

When a conductive agent is added, the positive electrode active material, the binder, and the conductive agent are preferably blended in proportions of 77% by mass to 95% by mass, 2% by mass to 20% by mass, and 3% by mass to 15% by mass, respectively.

By setting the amount of the conductive agent to 3% by mass or more, the above effect can be expressed. Also, by setting the amount of the conductive agent to 15% by mass or less, the ratio of the conductive agent in contact with the electrolyte can be reduced. When this ratio is low, decomposition of the electrolyte can be reduced during storage under high temperatures.

The positive electrode current collector is preferably titanium, aluminum, or an aluminum alloy containing one or more elements selected from Mg, Ti, Zn, Ni, Cr, Mn, Fe, Cu, and Si.

The thickness of the positive electrode current collector is preferably in the range of 5 µm to 20 µm and more preferably 15 µm or less.

Also, the positive electrode current collector may include a part on the surface where no positive electrode active material-containing layer is formed. The part can act as a positive electrode tab.

The positive electrode is produced by, for example, the following method. First, a positive electrode active material, a conductive agent, and a binder are suspended in a solvent to prepare a slurry. The slurry is applied to one side or both sides of a positive electrode current collector. Next, the applied slurry is dried to obtain a laminated body of the positive electrode active material-containing layer and the positive electrode current collector. Then, the laminated body is pressed. In this manner, a positive electrode is produced.

Alternatively, the positive electrode may be produced by the following method. First, a positive electrode active material, a conductive agent, and a binder are mixed to obtain a mixture. Subsequently, the mixture is formed in pellets. Subsequently, a positive electrode can be obtained by placing the pellets on a positive electrode current collector.

(4) Partition

The secondary battery according to present embodiment includes a partition that separates the first aqueous electrolyte and the second aqueous electrolyte. The partition is positioned between the negative electrode and the positive electrode and can prevent the negative electrode and the positive electrode from coming into contact with each other. As described above, the partition has, for example, a sheet shape in which an area of a first surface and an area of a second surface positioned on the side opposite to the first surface are significantly larger than the areas of the other surfaces. The second surface of the partition is a surface facing the first surface.

The partition can prevent the first aqueous electrolyte and the second aqueous electrolyte from mixing due to diffusion. In other words, the partition has impermeability to water and aqueous electrolyte. On the other hand, the partition never impedes electrical connection between the first aqueous electrolyte and the second aqueous electrolyte because it can pass alkali metal ions.

The partition contains a solid electrolyte having alkali metal ion conductivity. The solid electrolyte is in the form of, for example, particles. The partition may be formed from solid electrolyte particles. The partition may further contain an additive such as a binder. When an appropriate amount of the binder is contained in the partition, the partition can be flexible. This makes it easier to manufacture the partition thinner. When a thin partition is used, the deterioration of the rate performance can be prevented. In addition, a secondary battery having a wound structure can be manufactured by using a flexible partition.

The weight ratio of the solid electrolyte particles and the binder in the partition is within a range of, for example, 50:50 to 100:0, and preferably 60:40 to 100:0. If the ratio of the weight of the binder to the weight of the partition is too large, an ion conduction path is not formed and the resistance increases, which is not preferable. If the ratio is too small, it may be difficult to bind the solid electrolyte particles to each other.

The lithium ion conductivity of the solid electrolyte particle at 25° C. is preferably $1\times10^{-10}$ S/cm or more. The lithium ion conductivity of the solid electrolyte particle is more preferably $1\times10^{-7}$ S/cm or more.

The solid electrolyte particle is preferably, for example, an inorganic compound represented by $LiM_2(PO_4)_3$ having a NASICON skeleton (M is at least one material selected from Ti, Ge, Sr, Zr, Sn, and Al). Among them, $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$ are preferable because of their high ion conductivity and high electrochemical stability to water. In the above materials, x is preferably within a range of 0 to 0.5. Another example of the solid electrolyte particle includes an oxide such as amorphous LIPON ($Li_{2.9}PO_{3.3}N_{0.46}$) and garnet type LLZ ($Li_7La_3Zr_2O_{12}$).

Examples of the oxide having the garnet structure are $Li_{5+x}A_yLa_{3-y}M_2O_{12}$ (A is at least one selected from the group consisting of Ca, Sr, and Ba, and M is at least one selected from the group consisting of Nb and Ta), $Li_3M_{2-x}Zr_2O_{12}$ (M is at least one material selected from the group consisting of Ta and Nb), $Li_{7-3x}Al_xLa_3Zr_3O_{12}$, and $Li_7La_3Zr_2O_{12}$. In the above materials, x is, for example, $0 \le x < 0.8$, and preferably $0 \le x \le 0.5$. y is, for example, $0 \le y < 2$. The oxide having the garnet structure may contain one of these compounds or may contain a mixture of at least two of these compounds. Among them, $Li_{6.25}Al_{0.25}La_3Zr_3O_{12}$ and $Li_7La_3Zr_2O_{12}$ are excellent in discharge performance and cycle life performance because they have a high ion conductivity and are electrochemically stable.

The solid electrolyte particle may include only one of the compounds or may include a mixture of at least two of the compounds.

The solid electrolyte particle may include a polymeric solid electrolyte particle. The solid electrolyte particle may be the polymeric solid electrolyte particle. The polymeric solid electrolyte particle includes a polymeric material having ion conductivity. The polymeric solid electrolyte particle may include electrolyte salt in addition to the polymeric material having ion conductivity. The polymeric solid electrolyte particle may further include a solvent such as an organic solvent.

The partition may include a composite of a solid electrolyte and a polymeric material.

Examples of the polymeric material include a polyether-based material, a polyester-based material, a polyamine-based material, a polyethylene-based material, a silicone-based material, and a polysulfide-based material.

The average particle size of the solid electrolyte particles is, for example, 0.05 μm to 10 μm.

The average particle size of the solid electrolyte particles can be measured by a Scanning Electron Microscope (SEM).

(5) Container Member

As the container member, for example, a laminate film container or a metal container can be used.

The thickness of the laminate film is, for example, 0.5 mm or less, and preferably 0.2 mm or less.

As the laminate film, a multilayer film including plural of resin layers and a metal layer intervening between the resin layers can be used. The resin layer contains, for example, a polymeric material such as polypropylene (PP), polyethylene (PE), nylon, and polyethylene terephthalate (PET). The metal layer is preferably made of an aluminum foil or an aluminum alloy foil for weight reduction. The aluminum film can be molded into the shape of the container member by performing sealing through thermal fusion bonding.

The thickness of the wall of the metal container is, for example, 1 mm or less, preferably 0.5 mm or less, and more preferably 0.2 mm or less.

The metal container is made of, for example, aluminum or an aluminum alloy. The aluminum alloy preferable contains an element such as magnesium, zinc, and silicon. When the aluminum alloy contains a transition metal such as iron, copper, nickel, and chromium, the content thereof is preferably 100 ppm by mass or less.

The shape of the container member is not particularly limited. The shape of the container member may be, for example, a flat type (low-profile type), a rectangular type, a cylindrical type, a coin type, or a button type. The container member can be appropriately selected according to the size of the battery and the use of the battery.

The secondary battery according to this embodiment can be used in various forms such as a rectangular type, a cylindrical type, a flat type, a low-profile type, and a coin type.

(6) Negative Electrode Terminal

The negative electrode terminal can be formed from a material that is electrochemically stable at the potentials of alkali metal ions insertion/extraction of the negative active material and has a conductive property. Specifically, the material for the negative electrode terminal may contain zinc, copper, nickel, stainless steel or aluminum, or an aluminum alloy containing at least one element selected from Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector, the negative electrode terminal is preferably made of the same material as that of the negative electrode current collector.

(7) Positive Electrode Terminal

The positive electrode terminal is made of a material that is electrically stable in a potential range of 3 V to 4.5 V with respect to oxidation-reduction potential of alkali metal (vs. Li/Li$^+$) and has a conductive property. Examples of the material for the positive electrode terminal include titanium, nickel, aluminum, or an aluminum alloy containing at least one element selected from Mg, Ti, Zn, Mn, Fe, Cu, and Si.

In order to reduce the contact resistance between the positive electrode terminal and the positive electrode current collector, the positive electrode terminal is preferably made of the same material as that of the positive electrode current collector.

Next, the secondary battery according to the embodiment will be described in detail with reference to the drawings.

FIG. 1 is a sectional view schematically showing an example of a secondary battery according to the embodiment.

The secondary battery 100 shown in FIG. 1 includes a negative electrode 3, a positive electrode 5, a partition 4, a first aqueous electrolyte 8, a second aqueous electrolyte 9, and a container member 2. The negative electrode 3 includes a negative electrode current collector 3a and a negative electrode active material-containing layer 3b provided on part of both surfaces of the negative electrode current collector 3a. The negative electrode current collector 3a includes a negative electrode tab portion 3c which is not covered with the negative electrode active material-containing layer 3b. The positive electrode 5 includes a positive electrode current collector 5a and a positive electrode active material-containing layer 5b provided on part of both surfaces of the positive electrode current collector 5a. The positive electrode current collector 5a includes a positive electrode tab portion 5c which is not covered with the positive electrode active material-containing layer 5b.

The negative electrode 3 is stored in the container member 2 in a state in which the negative electrode tab 3c projects outward. The positive electrode 5 is stored in the container member 2 in a state in which the positive electrode tab 5c projects outward. The first aqueous electrolyte 8 is stored in the container member 2 such that at least a portion thereof comes into contact with the negative electrode 3. The second aqueous electrolyte 9 is stored in the container member 2 such that at least a portion thereof comes into contact with the positive electrode 5.

FIG. 1 shows an example in which the first aqueous electrolyte 8 contains an organic compound and the second aqueous electrolyte 9 does not contain the organic compound. In addition, FIG. 1 shows a case in which the first aqueous electrolyte 8 and the second aqueous electrolyte 9 are a liquid.

The partition 4 separates the negative electrode 3 and the first aqueous electrolyte 8 from the positive electrode 5 and the second aqueous electrolyte 9. The partition 4 may extend from the inside to the outside of the container member 2, as shown in FIG. 1, or may be provided inside the container member 2.

The secondary battery according to the embodiment may be a secondary battery having the structure shown in FIG. 2.

The secondary battery shown in FIG. 2 is a secondary battery having a bipolar structure.

The secondary battery 100 shown in FIG. 2 includes a container member 2, plural of current collectors 10a to 10c, and plural of partitions 4.

The current collector 10a constitutes a first structure 101 together with a negative electrode active material-containing layer 3b formed on part of one surface of the current collector 10a. The current collector 10b constitutes a second structure 102 together with a positive electrode active material-containing layer 5b formed on part of one surface of the current collector 10b. The current collector 10c constitutes a third structure 103 together with a negative electrode active material-containing layer 3b formed on part of one surface of the current collector 10c and a positive electrode active material-containing layer 5b formed on the other surface of the current collector 10c.

The first structure 101, the second structure 102, and plural of third structures 103 are stored in parallel to the vertical direction of the container member 2. However, a part of the current collector 10a and a part of the current collector 10b project from the inside to the outside of the container member 2.

The first structure 101, the plural of third structures 103, and the second structure 102 are stacked and stored in the container member 2 in a direction perpendicular to the vertical direction, with the partitions 4 intervening between the respective structures. A predetermined gap is provided between the respective structures and the partitions 4.

The secondary battery 100 includes a first aqueous electrolyte 8 in a gap between the surface of the first structure 101 on which the negative electrode active material-containing layer 3b is formed and the partition 4. At least a part of the first aqueous electrolyte 8 is in contact with the negative electrode active material-containing layer 3b. The secondary battery 100 includes a second aqueous electrolyte 9 in a gap between the surface of the second structure 102 on which the positive electrode active material-containing layer 5b is formed and the partition 4. At least a part of the second aqueous electrolyte 9 is in contact with the positive electrode active material-containing layer 5b.

In addition, the secondary battery 100 includes a first aqueous electrolyte 8 in a gap between the surface of the third structure 103 on which the negative electrode active material-containing layer 3b is formed and the partition 4. The secondary battery 100 includes a second aqueous electrolyte 9 in a gap between the surface of the third structure 103 on which the positive electrode active material-containing layer 5b is formed and the partition 4.

In the secondary battery 100 shown in FIG. 2, the partition 4 is positioned between the negative electrode active material-containing layer 3b and the positive electrode active material-containing layer 5b. The first aqueous electrolyte 8 and the second aqueous electrolyte 9 are separated by the partition 4 so that these electrolytes do not mix.

As such, when the secondary battery has the bipolar structure, a compact and high-capacity secondary battery can be obtained.

Figure 3:
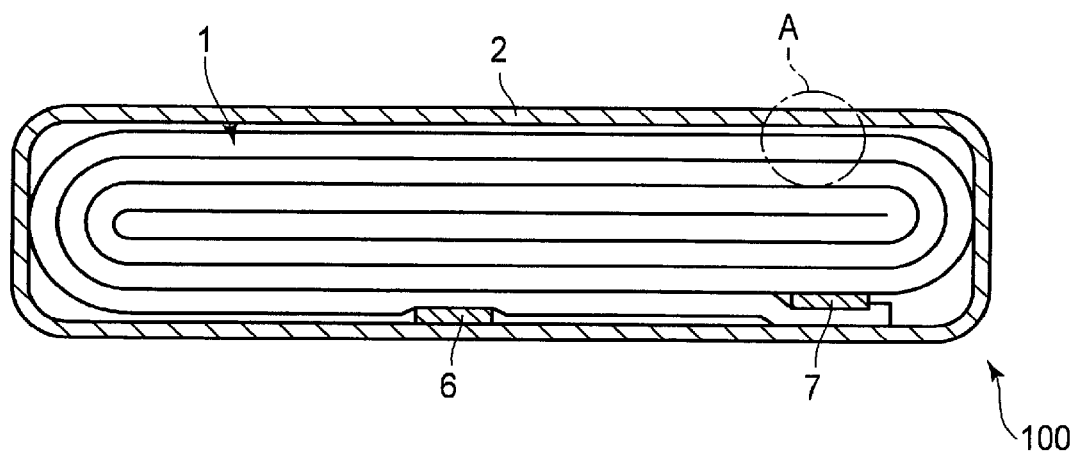
FIG. 3 is a sectional view schematically showing still another example of the secondary battery according to the first embodiment.
Figure 4:
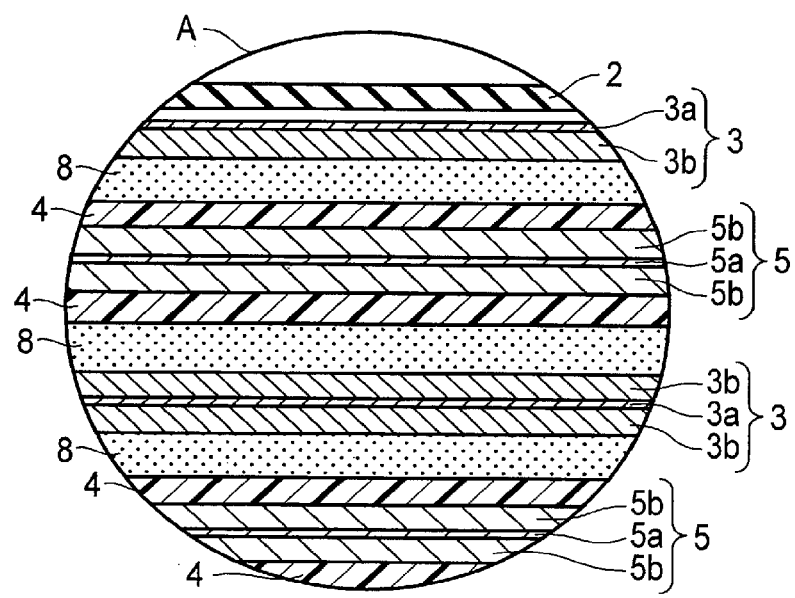
FIG. 4 is an enlarged sectional view of a portion A of the secondary battery shown in FIG. 3.

The secondary battery according to the embodiment may have a wound structure shown in FIG. 3 and FIG. 4.

FIG. 3 is a sectional view schematically showing another example of a secondary battery according to the embodiment. FIG. 4 is an enlarged sectional view of a portion A of the secondary battery shown in FIG. 3.

The secondary battery 100 shown in FIGS. 3 and 4 includes a flat wound electrode group 1, a container member 2, a negative electrode terminal 6, and a positive electrode terminal 7.

As shown in FIG. 4, the electrode group 1 includes a negative electrode 3, a partition 4, a positive electrode 5, and a first aqueous electrolyte 8 in a gel state. The first aqueous electrolyte 8 in a gel state is provided on both surfaces of the negative electrode 3. The partition 4 intervenes between the first aqueous electrolyte 8 and the positive electrode 5. A stacked structure is formed by stacking the negative electrode 3, the partition 4, and the positive electrode 5 with the first aqueous electrolyte 8 provided on both surfaces. The stacked structure is spirally wound with the negative electrode 3 facing outward, as shown in FIG. 4, and pressed, thereby forming the electrode group 1.

The negative electrode 3 includes a negative electrode current collector 3a and a negative electrode active material-containing layer 3b. The outermost negative electrode 3 has a structure in which the negative electrode active material-containing layer 3b is formed only on one inner-side surface of the negative electrode current collector 3a, as shown in FIG. 4. In each of the remaining negative electrodes 3, the negative electrode active material-containing layer 3b is formed on both surfaces of the negative electrode current collector 3a. The first aqueous electrolyte 8 in a gel state is stacked on the negative electrode active material-containing layer 3b included in each negative electrode 3.

The positive electrode 5 includes a positive electrode current collector 5a and a positive electrode active material-containing layer 5b provided on both sides of the positive electrode current collector 5a.

As shown in FIGS. 3 and 4, near the outer end of the electrode group 1, the negative electrode terminal 6 is connected to the negative electrode current collector 3a of the outermost negative electrode 3, and the positive electrode terminal 7 is connected to the positive electrode current collector 5a of the positive electrode 5 on the inner side.

The electrode group 1 is stored in the container member 2 made of a laminate film with a metal layer intervening between two resin layers.

The negative electrode terminal 6 and the positive electrode terminal 7 extend outward from opening portions of the container member 2. The second aqueous electrolyte (not shown) in a liquid state is poured from the opening portion of the container member 2 and stored in the container member 2.

The opening portion of the container member 2 is heat-sealed while sandwiching the negative electrode terminal 6 and the positive electrode terminal 7, thereby completely sealing the electrode group 1 and the second aqueous electrolyte. In the secondary battery 100 shown in FIGS. 3 and 4, at least a part of the first aqueous electrolyte 8 is in contact with the negative electrode 3, and the at least a part of the second aqueous electrolyte is in contact with the positive electrode 5.

As described above, the first aqueous electrolyte included in the secondary battery shown in FIGS. 3 and 4 is a gel aqueous electrolyte, and the second aqueous electrolyte is a liquid aqueous electrolyte. The liquid aqueous electrolyte does not permeate into the gel aqueous electrolyte. Hence, in this case, the first aqueous electrolyte and the second aqueous electrolyte do not mix. The first aqueous electrolyte may be a liquid aqueous electrolyte. The second aqueous electrolyte may be a gel aqueous electrolyte.

The secondary battery according to the embodiment may constitute a battery module. The battery module may include plural of secondary batteries according to the embodiment.

In the battery module according to the embodiment, individual unit cells may be electrically connected in series or in parallel, or may be arranged in combination of series connection and parallel connection.

An example of the battery module according to the embodiment will be described with reference to the drawings.

FIG. 5 is a perspective view schematically showing an example of the battery module according to the embodiment. The battery module 200 shown in FIG. 5 includes five unit cells 100a to 100e, four bus bars 21, a positive electrode-side lead 22, and a negative electrode-side lead 23. Each of the five unit cells 100a to 100e is the secondary battery according to the embodiment.

The bus bar 21 connects, for example, a negative electrode terminal 6 of one unit cell 100a and a positive electrode terminal 7 of the unit cell 100b positioned adjacent to the unit cell 100a. In this way, the five unit cells 100a to 100e are connected in series by the four bus bars 21. That is, the battery module 200 shown in FIG. 5 is a battery module of five in-series connection.

As shown in FIG. 5, the positive electrode terminal 7 of the unit cell 100a located at one end on the left among the five unit cells 100a to 100e is connected to the positive electrode-side lead 22 for external connection. In addition, the negative electrode terminal 6 of the unit cell 100e located at one end on the right among the five unit cells 100a to 100e is connected to the negative electrode-side lead 23 for external connection.

The secondary battery according the first embodiment includes the negative electrode, the positive electrode, the first aqueous electrolyte, the second aqueous electrolyte, and the partition having the first surface and the second surface opposite to the first surface. The partition is positioned between the negative electrode and the positive electrode. The first aqueous electrolyte is in contact with the first surface of the partition and the negative electrode. The second aqueous electrolyte is in contact with the second surface of the partition and the positive electrode. The partition contains a solid electrolyte having alkali metal ion conductivity. The first aqueous electrolyte contains an organic compound. Therefore, the secondary battery according to the first embodiment is excellent in both cycle life characteristic and storage performance.

Second Embodiment

According to a second embodiment, a battery pack is provided. The battery pack includes the secondary battery according to the first embodiment. The battery pack includes one secondary battery according to the first embodiment, or may include a battery module with plural of secondary batteries.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 6:
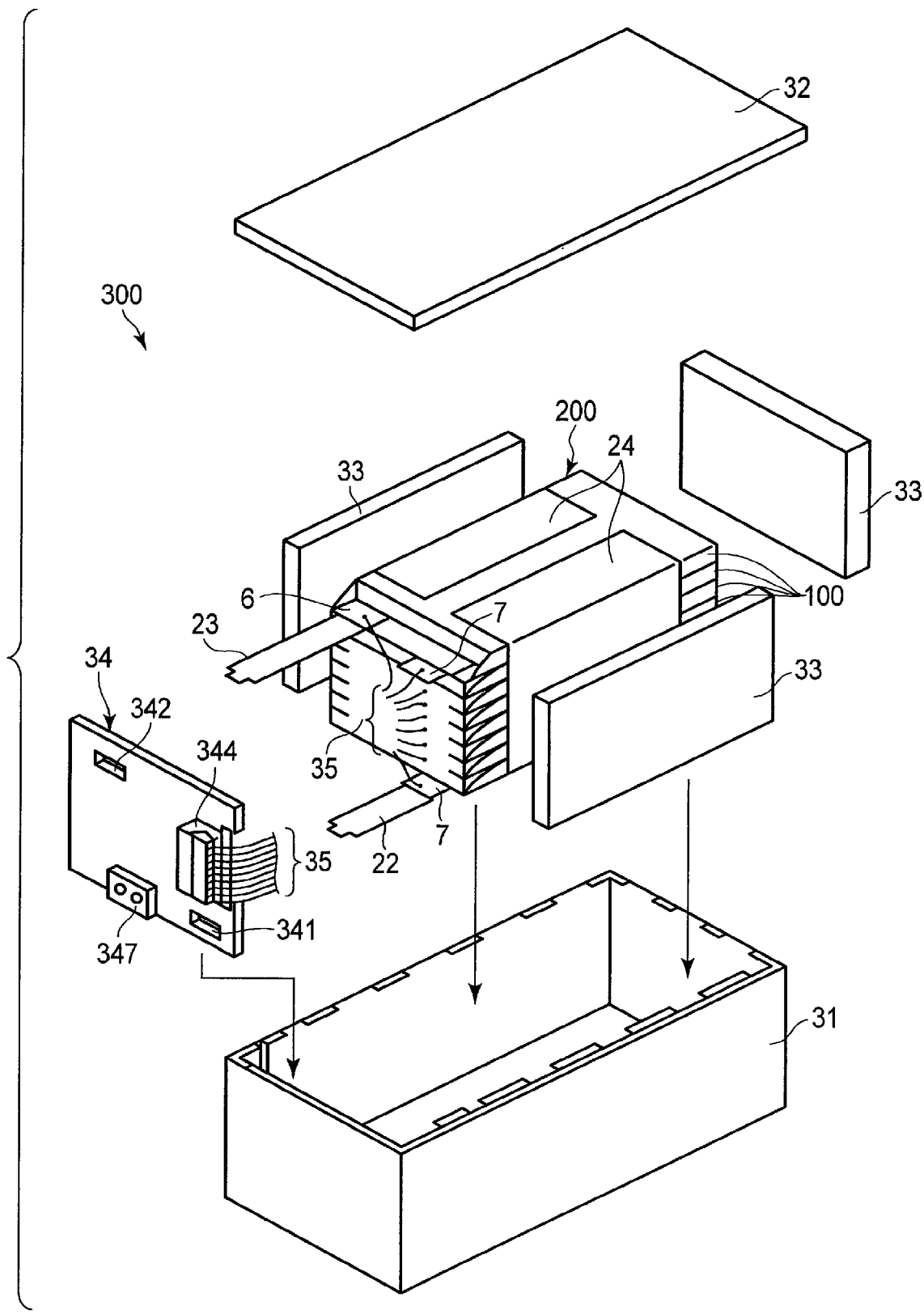
FIG. 6 is a perspective view schematically showing an example of a battery pack according to the second embodiment.

FIG. 6 is an exploded perspective view schematically showing an example of the battery pack according to the embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

A housing container 31 shown in FIG. 6 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural battery cells 100, a positive electrode-side lead 22, a negative electrode-side lead 23, and an adhesive tape 24.

The battery cell 100 has, for example, a structure shown in FIGS. 3 and 4. At least one of the plural battery cells 100 is a secondary battery according to the first embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 7. The plural battery cells 100 may alternatively be electrically connected in parallel, or connected in a combination of in-series connection and in-parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural battery cells 100.

One end of the positive electrode-side lead 22 is connected to the positive electrode terminal 7 of the battery cell 100 located lowermost in the stack of the battery cells 100. One end of the negative electrode-side lead 23 is connected to the negative electrode terminal 6 of the battery cell 100 located uppermost in the stack of the battery cells 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural battery cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over-charge, over-discharge, and overcurrent of the battery cell(s) 100. When detecting over-charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the second embodiment includes the secondary battery according to the first embodiment. Therefore, the battery pack can achieve excellent cycle life characteristic and storage performance.

Third Embodiment

According to a third embodiment, a vehicle is provided. The vehicle is equipped with the battery pack according to the second embodiment.

In a vehicle according to the embodiment, the battery pack is configured, for example, to recover regenerative energy from motive force of the vehicle. The vehicle may include a mechanism configured to convert kinetic energy of the vehicle into regenerative energy.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with plural of battery packs. In such a case, the battery packs may be electrically connected in series, in parallel, or in a combination of in series connection and in parallel connection.

An example of the vehicle according to the embodiment will be described with reference to the drawings.

FIG. 8 is a sectional view schematically showing an example of a vehicle according to the embodiment.

The vehicle 400 shown in FIG. 8 includes a vehicle body 40 and a battery pack 300 according to the second embodiment. The vehicle 400 shown in FIG. 8 is a four-wheel automobile.

This vehicle 400 may have plural battery packs 300 installed. In such a case, the battery packs 300 may be connected in series, connected in parallel, or connected in a combination of in-series connection and in-parallel connection.

In FIG. 8, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Figure 9:
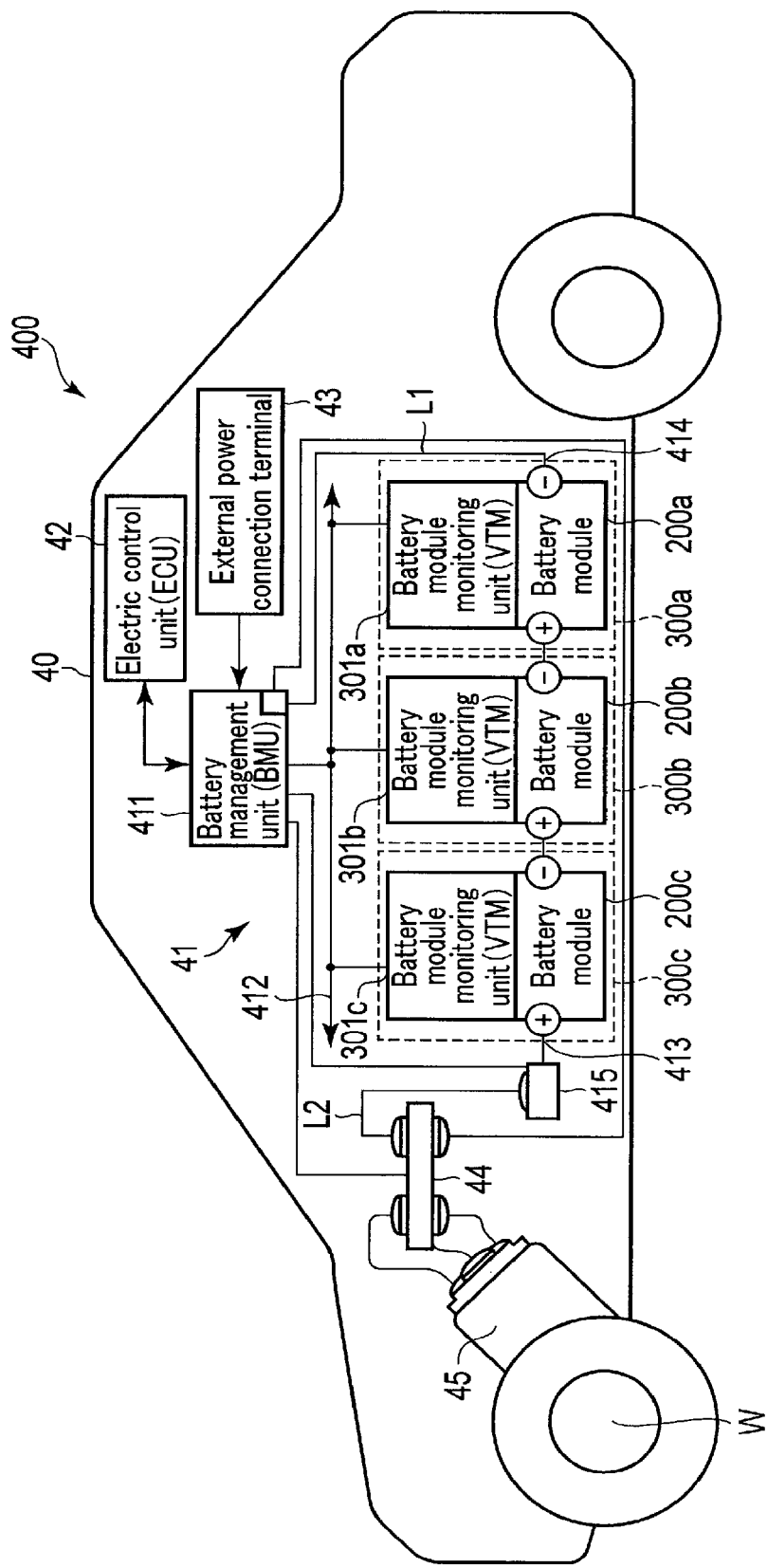
FIG. 9 is a view schematically showing another example of the vehicle according to the third embodiment.

Next, with reference to FIG. 9, an aspect of operation of the vehicle according to the embodiment is explained.

FIG. 9 is a view schematically showing an example of the vehicle according to the embodiment. A vehicle 400, shown in FIG. 9, is an electric automobile.

The vehicle 400, shown in FIG. 9, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 9, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (for example, VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 9) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted, for example, into the battery pack included the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the third embodiment includes the battery pack according to the second embodiment.

Therefore, according to the present embodiment, it is possible to provide the vehicle equipped with the battery pack capable of achieving excellent cycle life characteristic and storage performance.

EXAMPLES

Examples will be described below, but the embodiments are not limited to the examples to be described below.

Example 1

<Production of Positive Electrode>

In a plastic ointment vessel, lithium manganese oxide (LiMn$_2$O$_4$) having a spinel structure and an average particle size of 5 μm as a positive electrode active material, vapor-grown carbon fiber with a fiber diameter of 0.1 μm as a conductive agent, graphite powder, and polyvinylidene fluoride (PVDF) as a binder were combined at a weight ratio of 10:0.3:0.5:12.5 to prepare a slurry. As the binder, an NMP dispersion solution having a PVDF solid content of 56% was used. The slurry was applied to both surfaces of a nickel foil having a thickness of 10 μm and was then dried and pressed to produce a positive electrode. The thickness of one surface of a positive electrode active material-containing layer included in the positive electrode was 43 μm, and the positive electrode density was 2.2 g/cm$^3$.

<Production of Negative Electrode>

In a plastic ointment vessel, Li$_4$Ti$_5$O$_{12}$ powder having a secondary particle size (diameter) of 10 μm, a conductive agent (KS-6, manufactured by TIMCAL), zinc powder, and tetrafluoroethylene (PTFE) as a binder were mixed at a weight ratio 92:10:5:10 and stirred using a ball mill at a rotating speed of 1,000 rpm and a stirring time of 2 hours to prepare a slurry. As the binder, an NMP dispersion solution having a PTFE solid content of 60% was used. The obtained slurry was applied to both surfaces of a nickel foil having a thickness of 10 μm and was then dried and pressed to prepare a negative electrode. The thickness of one surface of a negative electrode active material-containing layer included in the negative electrode was 59 μm. The negative electrode density was 2.2 g/cm$^3$.

<Preparation of First Aqueous Electrolyte>

12 mol/L of LiCl was dissolved in water to prepare a solution. NMP (N-methyl-2-pyrrolidone) was mixed with the solution at a ratio of 10 vol % with respect to the total solution to prepare a first aqueous electrolytic solution. pH of the first aqueous electrolytic solution was adjusted to 14. pH was measured with a pH test paper manufactured by MACHEREY-NAGEL.

<Preparation of Second Aqueous Electrolyte>

12 mol/L of LiCl was dissolved in water to prepare a second aqueous electrolytic solution. pH of the second aqueous electrolytic solution was adjusted to 5. pH was measured with a pH test paper manufactured by MACHEREY-NAGEL.

<Production of Partition>

A Li$_{1.3}$A$_{10.3}$Ti$_{1.7}$(PO$_4$)$_3$ plate having a thickness of 50 μm was produced.

<Production of Electrode Group>

The second aqueous electrolytic solution was impregnated in the positive electrode, and then the positive electrode was brought into close contact with one surface of the partition. In addition, the first aqueous electrolytic solution was impregnated in the negative electrode, and then the negative electrode was brought into close contact with the other surface of the partition, thereby obtaining an electrode group.

<Production of Secondary Battery>

The obtained electrode group was stored in a thin metal can made of stainless steel with a thickness of 0.25 mm. Note that a valve configured to leak a gas when the internal pressure is 2 atmospheric pressure or more is installed in the metal. As such, a laminated secondary battery having a thickness of 16 mm, a width of 40 mm, and a height of 60 mm was manufactured.

<Rate Characteristic Evaluation>

The secondary battery was charged up to 2.75 V by a constant current of a 1 C rate under a 25° C. environment. The 1c rate is a current value for a negative electrode active material to be charged in exactly one hour. Then, a discharge capacity when the secondary battery was discharged up to 2.1 V by 1 C was measured.

In addition, the secondary battery was charged up to 2.75 V by a constant current of a 1 C rate under a 25° C. environment. The 1c rate is a current value for a negative electrode active material to be charged in exactly one hour. Then, a capacity retention ratio (%) when the secondary battery was discharged up to 2.1 v by 5 C was calculated by the following equation.

(Capacity Retention Ratio)=(Discharge Capacity at 5 C discharge)/(Discharge Capacity at 1 C discharge)×100

<Cycle Life Evaluation>

The secondary battery was charged up to 2.75 V by a constant current of a 1 C rate under a 25° C. environment. The 1c rate is a current value for a negative electrode active material to be charged in exactly one hour. Then the secondary battery was discharged up to 2.1 V by 1 C. This was set as one charge-and-discharge cycle. The charge-and-discharge cycle was repeated, and the number of cycles when the discharge amount reached 80% of the discharge capacity in the first charge-and-discharge cycle was defined as the cycle life.

<Storage Performance Evaluation>

The secondary battery was charged up to 2.75 V by a constant current of a 1 C rate under a 25° C. environment. The 1c rate is a current value for a negative electrode active material to be charged in exactly one hour. Then, the secondary battery was discharged up to 2.1 V by 1 C, and an initial discharge capacity was measured. After the secondary battery was charged up to 2.75 V by a constant current of a 1 C rate, the secondary battery was left stand for 24 hours. The 1c rate is a current value for a negative electrode active material to be charged in exactly one hour. Then, the secondary battery was discharged up to 2.1 V by 1 C.

As the index of the storage performance, the self-discharge rate was calculated by the following equation. The self-discharge rate calculated by the following equation indicates that, as the value becomes lower, the storage performance is more excellent.

(Self-Discharge Rate)=100−(Discharge Capacity After 24 Hours)/(Initial Discharge Capacity)×100

Examples 2 to 34 and Comparative Example 1 to 3

According to Tables 1 to 3 below, secondary batteries were manufactured in the same manner as in Example 1, except for changing the kind of the negative electrode active material, the kind of the positive electrode active material, the composition of the partition, the composition of the first aqueous electrolyte, and the composition of the second aqueous electrolyte, and evaluations thereof were performed. The evaluation results are shown in Table 4 below.

As shown in Table 1, in Comparative Example 1, a polypropylene porous film having a thickness of 20 μm was used instead of the solid electrolyte as the partition.

In Table 2, the column of "ratio M1" represents a ratio of a molar concentration (mol/L) of an organic compound to a molar concentration (mol/L) of water in a first aqueous electrolyte.

In Table 3, the column of "ratio M2" represents a ratio of a molar concentration (mol/L) of an organic compound to a molar concentration (mol/L) of water in a second aqueous electrolyte.

In Table 4, the column of "25° C. discharge capacity" represents a discharge capacity (at the first cycle) when a secondary battery was charged up to 2.75 V by a constant current of a 1 C rate (based on the negative electrode active material) under a 25° C. environment and then discharged up to 2.1 V by 1 C. The column of "capacity retention ratio" represents a capacity retention ratio (%) calculated by the rate characteristic evaluation described above. The column of "cycle life" represents a cycle life (number of times) measured by the cycle life evaluation described above. The column of "self-discharge rate" represents a self-discharge rate (%) calculated by the storage performance evaluation described above.

TABLE 1

|  | Negative Electrode | Positive Electrode Active Material | Composition of Partition |
|---|---|---|---|
| Example 1 | $Li_4Ti_5O_{12}$ | $LiMn_2O_4$ | $Li_{1.3}Al_{0.3}Ti_{1.7}(PO_4)_3$ |
| Example 2 | $Li_4Ti_5O_{12}$ | $LiMn_2O_4$ | $Li_{1.3}Al_{0.3}Ti_{1.7}(PO_4)_3$ |
| Example 3 | $Li_4Ti_5O_{12}$ | $LiMn_2O_4$ | $Li_{1.3}Al_{0.3}Ti_{1.7}(PO_4)_3$ |
| Example 4 | $Li_4Ti_5O_{12}$ | $LiMn_2O_4$ | $Li_{1.3}Al_{0.3}Ti_{1.7}(PO_4)_3$ |
| Example 5 | $Li_4Ti_5O_{12}$ | $LiMn_2O_4$ | $Li_{1.3}Al_{0.3}Ti_{1.7}(PO_4)_3$ |
| Example 6 | $Li_4Ti_5O_{12}$ | $LiMn_2O_4$ | $Li_{1.3}Al_{0.3}Ti_{1.7}(PO_4)_3$ |
| Example 7 | $Li_4Ti_5O_{12}$ | $LiMn_2O_4$ | $Li_{1.3}Al_{0.3}Ti_{1.7}(PO_4)_3$ |
| Example 8 | $Li_4Ti_5O_{12}$ | $LiMn_2O_4$ | $Li_{1.3}Al_{0.3}Ti_{1.7}(PO_4)_3$ |
| Example 9 | $Li_4Ti_5O_{12}$ | $LiMn_2O_4$ | $Li_{1.3}Al_{0.3}Ti_{1.7}(PO_4)_3$ |
| Example 10 | $Li_4Ti_5O_{12}$ | $LiMn_2O_4$ | $Li_{1.3}Al_{0.3}Ti_{1.7}(PO_4)_3$ |
| Example 11 | $Li_4Ti_5O_{12}$ | $LiMn_2O_4$ | $Li_{1.3}Al_{0.3}Ti_{1.7}(PO_4)_3$ |
| Example 12 | $Li_4Ti_5O_{12}$ | $LiMn_2O_4$ | $Li_{1.3}Al_{0.3}Ti_{1.7}(PO_4)_3$ |
| Example 13 | $Li_4Ti_5O_{12}$ | $LiMn_2O_4$ | $Li_{1.3}Al_{0.3}Ti_{1.7}(PO_4)_3$ |
| Example 14 | $Li_4Ti_5O_{12}$ | $LiMn_2O_4$ | $Li_{1.3}Al_{0.3}Ti_{1.7}(PO_4)_3$ |
| Example 15 | $Li_4Ti_5O_{12}$ | $LiMn_2O_4$ | $Li_{1.3}Al_{0.3}Ti_{1.7}(PO_4)_3$ |
| Example 16 | $Li_4Ti_5O_{12}$ | $LiMn_2O_4$ | $Li_{1.3}Al_{0.3}Ti_{1.7}(PO_4)_3$ |
| Example 17 | $Li_4Ti_5O_{12}$ | $LiMn_2O_4$ | $Li_{1.3}Al_{0.3}Ti_{1.7}(PO_4)_3$ |
| Example 18 | $Li_4Ti_5O_{12}$ | $LiMn_2O_4$ | $Li_{1.3}Al_{0.3}Zr_{1.7}(PO_4)_3$/PTFE |
| Example 19 | $Li_4Ti_5O_{12}$ | $LiMn_2O_4$ | $Li_{1.4}Al_{0.4}Ge_{0.2}Ti_{1.4}(PO_4)_3$ |
| Example 20 | $Li_4Ti_5O_{12}$ | $LiMn_2O_4$ | $Li_{1.4}Al_{0.4}Ge_{0.2}Ti_{1.4}(PO_4)_3$/PTFE |
| Example 21 | $Li_4Ti_5O_{12}$ | $LiMn_2O_4$ | $Li_{1.3}Al_{0.3}Zr_{1.7}(PO_4)_3$ |
| Example 22 | $Li_4Ti_5O_{12}$ | $LiMn_2O_4$ | $Li_{1.3}Al_{0.3}Ti_{1.7}(PO_4)_3$ |
| Example 23 | $Li_4Ti_5O_{12}$ | $LiMn_2O_4$ | $Li_{1.3}Al_{0.3}Ti_{1.7}(PO_4)_3$ |
| Example 24 | $Li_4Ti_5O_{12}$ | $LiMn_2O_4$ | $Li_{1.3}Al_{0.3}Ti_{1.7}(PO_4)_3$ |
| Example 25 | $Li_4Ti_5O_{12}$ | $LiMn_2O_4$ | $Li_{1.3}Al_{0.3}Ti_{1.7}(PO_4)_3$ |
| Example 26 | $Li_4Ti_5O_{12}$ | $LiMn_2O_4$ | $Li_{1.3}Al_{0.3}Ti_{1.7}(PO_4)_3$ |
| Example 27 | $Li_4Ti_5O_{12}$ | $LiMn_2O_4$ | $Li_{1.3}Al_{0.3}Ti_{1.7}(PO_4)_3$ |
| Example 28 | $Li_4Ti_5O_{12}$ | $LiMn_2O_4$ | $Li_{1.3}Al_{0.3}Ti_{1.7}(PO_4)_3$ |
| Example 29 | $Li_4Ti_5O_{12}$ | $LiMn_2O_4$ | $Li_{1.3}Al_{0.3}Ti_{1.7}(PO_4)_3$ |
| Example 30 | $Li_4Ti_5O_{12}$ | $LiFePO_4$ | $Li_{1.3}Al_{0.3}Ti_{1.7}(PO_4)_3$ |
| Example 31 | $Li_4Ti_5O_{12}$ | $LiNi_{0.8}Co_{0.1}Mn_{0.1}O_2$ | $Li_{1.3}Al_{0.3}Ti_{1.7}(PO_4)_3$ |
| Example 32 | Anatase-type $TiO_2$ | $LiMn_2O_4$ | $Li_{1.3}Al_{0.3}Ti_{1.7}(PO_4)_3$ |
| Example 33 | $TiNb_2O_7$ | $LiMn_2O_4$ | $Li_{1.3}Al_{0.3}Ti_{1.7}(PO_4)_3$ |
| Example 34 | $LiTi_2(PO_4)_3$ | $LiMn_2O_4$ | $Li_{1.3}Al_{0.3}Ti_{1.7}(PO_4)_3$ |

TABLE 1-continued

|  | Negative Electrode | Positive Electrode Active Material | Composition of Partition |
|---|---|---|---|
| Comparative Example 1 | $Li_4Ti_5O_{12}$ | $LiMn_2O_4$ | Polypropylene porous film Thickness: 20 μm |
| Comparative Example 2 | $Li_4Ti_5O_{12}$ | $LiMn_2O_4$ | $Li_{1.3}Al_{0.3}Ti_{1.7}(PO_4)_3$ |
| Comparative Example 3 | $Li_4Ti_5O_{12}$ | $LiMn_2O_4$ | $Li_{1.3}Al_{0.3}Ti_{1.7}(PO_4)_3$ |

TABLE 2

First Aqueous Electrolyte (Negative Electrode)

|  | Type and Concentration of Electrolyte Salt | pH | Type and Molar Concentration (Volume Concentration) of First Organic Compound | Concentration of Water (mol/L) | Ratio M1 |
|---|---|---|---|---|---|
| Example 1 | LiCl 12 mol/L | 14 | NMP 1.02 mol/L (10 vol %) | 37.9 | 0.027 |
| Example 2 | LiCl 12 mol/L | 14 | Succinimide 1.52 mol/L (10 vol %) | 40.0 | 0.038 |
| Example 3 | LiCl 12 mol/L | 14 | Methanol 2.6 mol/L (10 vol %) | 40.0 | 0.065 |
| Example 4 | LiCl 12 mol/L | 14 | Ethanol 1.8 mol/L (10 vol %) | 40.0 | 0.045 |
| Example 5 | LiCl 12 mol/L | 14 | Isopropyl alcohol 1.36 mol/L (10 vol %) | 40.0 | 0.034 |
| Example 6 | LiCl 12 mol/L | 14 | NMP 1.02 mol/L (10 vol %) | 37.9 | 0.027 |
| Example 7 | LiCl 12 mol/L | 14 | NMP 1.02 mol/L (10 vol %) | 37.9 | 0.027 |
| Example 8 | $LiN(SO_2F)_2$ 5 mol/L | 14 | NMP 0.52 mol/L (5 vol %) | 13.1 | 0.040 |
| Example 9 | $LiNO_3$ 9 mol/L | 14 | NMP 1.02 mol/L (10 vol.%) | 37.9 | 0.027 |
| Example 10 | LiCl 12 mol/L | 14 | NMP 1.02 mol/L (10 vol %) | 37.9 | 0.027 |
| Example 11 | LiCl 12 mol/L | 14 | NMP 1.02 mol/L (10 vol %) | 37.9 | 0.027 |
| Example 12 | LiCl 12 mol/L | 14 | NMP 1.02 mol/L (10 vol %) | 37.9 | 0.027 |
| Example 13 | LiCl 12 mol/L | 14 | NMP 1.02 mol/L (10 vol %) | 37.9 | 0.027 |
| Example 14 | LiCl 12 mol/L | 14 | NMP 0.32 mol/L (3 vol %) | 40.8 | 0.008 |
| Example 15 | LiCl 12 mol/L | 14 | NMP 1.39 mol/L (15 vol %) | 35.8 | 0.039 |
| Example 16 | LiCl 12 mol/L | 14 | NMP 0.12 mol/L (1 vol %) | 41.7 | 0.003 |
| Example 17 | LiCl 12 mol/L | 14 | NMP 2.05 mol/L (25 vol %) | 31.6 | 0.065 |
| Example 18 | LiCl 12 mol/L | 14 | NMP 1.02 mol/L (10 vol %) | 37.9 | 0.027 |
| Example 19 | LiCl 12 mol/L | 14 | NMP 1.02 mol/L (10 vol %) | 37.9 | 0.027 |
| Example 20 | LiCl 12 mol/L | 14 | NMP 1.02 mol/L (10 vol %) | 37.9 | 0.027 |
| Example 21 | LiCl 12 mol/L | 14 | NMP 1.02 mol/L (10 vol.%) | 37.9 | 0.027 |
| Example 22 | LiCl 12 mol/L | 14 | NMP 0.51 mol/L (5 vol %) + Ethanol 0.85 mol/L (5 vol.%) | 37.9 | 0.036 |
| Example 23 | LiCl 12 mol/L | 14 | NMP 0.31 mol/L (3 vol %) + Ethanol 0.34 mol/L (2 vol %) | 40.0 | 0.016 |
| Example 24 | LiCl 12 mol/L | 14 | Ethanol 0.85 mol/L (5 vol %) + Methanol 1.23 mol/L (5 vol %) | 37.9 | 0.055 |
| Example 25 | LiCl 12 mol/L | 14 | NMP 0.51 mol/L (5 vol %) + Succinimide 0.71 mol/L (5 vol %) | 37.9 | 0.032 |
| Example 26 | LiCl 12 mol/L | 14 | NMP 1.02 mol/L (10 vol %) | 37.9 | 0.027 |
| Example 27 | LiCl 12 mol/L | 10 | NMP 1.02 mol/L (10 vol %) | 37.9 | 0.027 |
| Example 28 | LiCl 12 mol/L | 7 | NMP 1.02 mol/L (10 vol %) | 37.9 | 0.027 |
| Example 29 | LiCl 12 mol/L | 5 | NMP 1.02 mol/L (10 vol %) | 37.9 | 0.027 |
| Example 30 | LiCl 12 mol/L | 14 | NMP 1.02 mol/L (10 vol %) | 37.9 | 0.027 |
| Example 31 | LiCl 12 mol/L | 14 | NMP 1.02 mol/L (10 vol %) | 37.9 | 0.027 |
| Example 32 | LiCl 12 mol/L | 14 | NMP 1.02 mol/L (10 vol %) | 37.9 | 0.027 |
| Example 33 | LiCl 12 mol/L | 14 | NMP 1.02 mol/L (10 vol %) | 37.9 | 0.027 |
| Example 34 | LiCl 12 mol/L | 14 | NMP 1.02 mol/L (10 vol %) | 37.9 | 0.027 |
| Comparative Example 1 | LiCl 12 mol/L | 14 | NMP 1.02 mol/L (10 vol %) | 37.9 | 0.027 |
| Comparative Example 2 | LiCl 12 mol/L | 14 | No addition | 42.1 | 0 |
| Comparative Example 3 | LiCl 12 mol/L | 14 | No addition | 42.1 | 0 |

TABLE 3

Second Aqueous Electrolyte (Positive Electrode)

|  | Type and Concentration of Electrolyte Salt | pH | Type and Molar Concentration (Volume Concentration) of Second Organic Compound | Concentration of Water (mol/L) | Ratio M2 |
|---|---|---|---|---|---|
| Example 1 | LiCl 12 mol/L | 5 | — | 42.1 | 0 |
| Example 2 | LiCl 12 mol/L | 5 | — | 42.1 | 0 |

TABLE 3-continued

| | Second Aqueous Electrolyte (Positive Electrode) | | | | |
|---|---|---|---|---|---|
| | Type and Concentration of Electrolyte Salt | pH | Type and Molar Concentration (Volume Concentration) of Second Organic Compound | Concentration of Water (mol/L) | Ratio M2 |
| Example 3 | LiCl 12 mol/L | 5 | — | 42.1 | 0 |
| Example 4 | LiCl 12 mol/L | 5 | — | 42.1 | 0 |
| Example 5 | LiCl 12 mol/L | 5 | — | 42.1 | 0 |
| Example 6 | LiCl 9 mol/L | 5 | — | 45.5 | 0 |
| Example 7 | $Li_2SO_4$ 2 mol/L | 4.5 | — | 52.6 | 0 |
| Example 8 | LiCl 12 mol/L | 5 | — | 42.1 | 0 |
| Example 9 | LiCl 12 mol/L | 5 | — | 42.1 | 0 |
| Example 10 | $LiNO_3$ 9 mol/L | 5 | — | 42.1 | 0 |
| Example 11 | LiCl 12 mol/L | 5 | Acetonitrile 0.17 mol/L (1 vol %) | 41.6 | 0.004 |
| Example 12 | LiCl 12 mol/L | 5 | Acetonitrile 0.57 mol/L (3 vol %) | 40.8 | 0.014 |
| Example 13 | LiCl 12 mol/L | 5 | Tetrahydrofuran 0.37 mol/L (3 vol %) | 40.8 | 0.009 |
| Example 14 | LiCl 12 mol/L | 5 | — | 42.1 | 0 |
| Example 15 | LiCl 12 mol/L | 5 | — | 42.1 | 0 |
| Example 16 | LiCl 12 mol/L | 5 | — | 42.1 | 0 |
| Example 17 | LiCl 12 mol/L | 5 | — | 42.1 | 0 |
| Example 18 | LiCl 12 mol/L | 5 | — | 42.1 | 0 |
| Example 19 | LiCl 12 mol/L | 5 | — | 42.1 | 0 |
| Example 20 | LiCl 12 mol/L | 5 | — | 42.1 | 0 |
| Example 21 | LiCl 12 mol/L | 5 | — | 42.1 | 0 |
| Example 22 | LiCl 12 mol/L | 5 | — | 42.1 | 0 |
| Example 23 | LiCl 12 mol/L | 5 | — | 42.1 | 0 |
| Example 24 | LiCl 12 mol/L | 5 | — | 42.1 | 0 |
| Example 25 | LiCl 12 mol/L | 5 | — | 42.1 | 0 |
| Example 26 | LiCl 12 mol/L | 5 | — | 42.1 | 0 |
| Example 27 | LiCl 12 mol/L | 5 | — | 42.1 | 0 |
| Example 28 | LiCl 12 mol/L | 5 | — | 42.1 | 0 |
| Example 29 | LiCl 12 mol/L | 5 | — | 42.1 | 0 |
| Example 30 | LiCl 12 mol/L | 5 | — | 42.1 | 0 |
| Example 31 | LiCl 12 mol/L | 5 | — | 42.1 | 0 |
| Example 32 | LiCl 12 mol/L | 5 | — | 42.1 | 0 |
| Example 33 | LiCl 12 mol/L | 5 | — | 42.1 | 0 |
| Example 34 | LiCl 12 mol/L | 5 | — | 42.1 | 0 |
| Comparative Example 1 | LiCl 12 mol/L | 5 | NMP 1.02 mol/L (10 vol %) | 37.9 | 0.027 |
| Comparative Example 2 | LiCl 12 mol/L | 5 | NMP 1.02 mol/L (10 vol %) | 37.9 | 0.027 |
| Comparative Example 3 | LiCl 12 mol/L | 5 | No addition | 42.1 | 0 |

TABLE 4

| | 25° C. Discharge Capacity (mAh) | Capacity Retention Ratio (%) | Cycle Life (times) | Self-Discharge Rate (%) |
|---|---|---|---|---|
| Example 1 | 2300 | 80 | 12000 | 5 |
| Example 2 | 2300 | 83 | 11400 | 7 |
| Example 3 | 2200 | 75 | 10800 | 9 |
| Example 4 | 2250 | 80 | 11400 | 9 |
| Example 5 | 2200 | 80 | 11400 | 9 |
| Example 6 | 2350 | 80 | 12000 | 5 |
| Example 7 | 2400 | 80 | 12000 | 5 |
| Example 8 | 2000 | 70 | 9600 | 4 |
| Example 9 | 2300 | 80 | 12000 | 7 |
| Example 10 | 2300 | 80 | 12000 | 5 |
| Example 11 | 2300 | 78 | 12000 | 9 |
| Example 12 | 2300 | 75 | 12000 | 7 |
| Example 13 | 2300 | 75 | 12000 | 7 |
| Example 14 | 2350 | 82 | 11000 | 6 |
| Example 15 | 2200 | 75 | 13200 | 4 |
| Example 16 | 2500 | 85 | 10000 | 8 |
| Example 17 | 2000 | 70 | 14400 | 3 |
| Example 18 | 2300 | 84 | 14000 | 5 |
| Example 19 | 2300 | 75 | 12000 | 5 |
| Example 20 | 2300 | 82 | 14000 | 5 |
| Example 21 | 2300 | 71 | 12000 | 5 |
| Example 22 | 2200 | 75 | 13000 | 4 |
| Example 23 | 2350 | 82 | 10000 | 7 |
| Example 24 | 2300 | 70 | 9500 | 9 |
| Example 25 | 2300 | 78 | 13000 | 9 |
| Example 26 | 2000 | 80 | 14000 | 12 |
| Example 27 | 1800 | 80 | 15500 | 30 |
| Example 28 | 1500 | 80 | 16200 | 42 |
| Example 29 | 1000 | 80 | 17000 | 70 |
| Example 30 | 2300 | 80 | 12000 | 5 |
| Example 31 | 1900 | 77 | 7000 | 5 |
| Example 32 | 2400 | 61 | 10000 | 11 |
| Example 33 | 2600 | 80 | 12000 | 15 |
| Example 34 | 2200 | 83 | 12500 | 4 |
| Comparative Example 1 | 600 | 88 | 620 | 100 |
| Comparative Example 2 | 1900 | 77 | 8000 | 47 |
| Comparative Example 3 | 1100 | 81 | 7000 | 60 |

As shown by comparison between Examples and Comparative Examples, there are some changes in battery performance depending on the negative electrode active materials and the positive electrode active materials used therein. However, in the secondary batteries according to Examples, since the first aqueous electrolyte contains the organic compound, the secondary batteries are excellent in both cycle life and storage performance while suppressing excessive reduction in capacity retention ratio (rate characteristic).

In each of the secondary batteries according to Examples, the ratio M1 is higher than the ratio M2. Thus, the secondary batteries according to Examples are excellent in both cycle life and storage performance while suppressing excessive reduction in capacity retention ratio (rate characteristic).

In any of Examples, since the ratio M1 is within a range of 0.001 to 0.1, the secondary batteries are excellent in both cycle life and storage performance while suppressing excessive reduction in capacity retention ratio (rate characteristic).

In Examples 18 and 20, the partition contained PTFE as the binder in addition to the solid electrolyte particles. In Examples 18 and 20 in which the partition including PTFE is used, the frequency of contact between the solid electrolyte particles and hydroxide ions can be lowered, as compared with the case where the partition do not contain the binder. As a result, the corrosion of the solid electrolyte particles (partition) can be suppressed, and thus it is considered that the cycle life characteristic is improved. In addition, it is considered that the storage performance was also improved.

In Comparative Example 1, both the first aqueous electrolyte and the second aqueous electrolyte contained an organic compound, but a porous film made of polypropylene was used instead of the partition containing the solid electrolyte. In Comparative Example 1, the cycle life is remarkably inferior to all of Examples.

In Comparative Example 2, an organic compound was contained only in the second aqueous electrolyte (positive electrode side). In Comparative Example 3, neither the first aqueous electrolyte nor the second aqueous electrolyte contained an organic compound. In such Comparative Examples, at least one of cycle life and storage performance is inferior to all of Examples.

According to at least one embodiment and Example described above, a secondary battery is provided. The secondary battery includes a negative electrode, a positive electrode, a first aqueous electrolyte, a second aqueous electrolyte, and a partition having a first surface and a second surface opposite to the first surface. The partition is positioned between the negative electrode and the positive electrode. The first aqueous electrolyte is in contact with the first surface of the partition and the negative electrode. The second aqueous electrolyte is in contact with the second surface of the partition and the positive electrode. The partition contains a solid electrolyte having alkali metal ion conductivity. The first aqueous electrolyte contains an organic compound. In this secondary battery, since electrolysis of water can be suppressed and corrosion of the solid electrolyte can also be suppressed, cycle life characteristic and storage performance are improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising a negative electrode, a positive electrode, a first aqueous electrolyte, a second aqueous electrolyte, and a partition having a first surface and a second surface opposite to the first surface, wherein:
   the partition is positioned between the negative electrode and the positive electrode,
   the first aqueous electrolyte is in contact with the first surface of the partition and the negative electrode,
   the second aqueous electrolyte is in contact with the second surface of the partition and the positive electrode,
   the partition comprises a solid electrolyte having alkali metal ion conductivity,
   the first aqueous electrolyte comprises a first organic compound, and
   when the second aqueous electrolyte comprises a second organic compound, a ratio M1 of a molar concentration of the first organic compound to a molar concentration of water in the first aqueous electrolyte is higher than a ratio M2 of a molar concentration of the second organic compound to a molar concentration of water in the second aqueous electrolyte.

2. The secondary battery according to claim 1, wherein the ratio M1 is within a range of 0.0001 to 0.5.

3. The secondary battery according to claim 1, wherein a pH of the first aqueous electrolyte is within a range of 6 to 14.

4. The secondary battery according to claim 1, wherein the first organic compound is at least one selected from the group consisting of:
   N-methyl-2-pyrrolidone (NMP), succinimide, acetonitrile, methylamine, 2-amino-methylpropane, propyl amine, dimethylamine, diethylamine, trimethylamine, triphenylamine, acetamide, N-methylacetamide, dimethylacetamide, dimethylformamide, butyramide, and derivatives thereof; and
   methanol, ethanol, propanol, isopropanol, butanol, isobutyl alcohol, ethylene glycol, dimethyl ether, and derivatives thereof.

5. The secondary battery according to claim 1, wherein the partition comprises a composite of the solid electrolyte and a polymeric material.

6. A battery pack comprising the secondary battery according to claim 1.

7. The battery pack according to claim 6, further comprising an external power distribution terminal and a protective circuit.

8. The battery pack according to claim 6, further comprising plural of the secondary battery,
   wherein the secondary batteries are electrically connected in series, in parallel, or in combination of series connection and parallel connection.

9. A vehicle comprising the battery pack according to claim 6.

10. The vehicle according to claim 9, which comprises a mechanism configured to convert kinetic energy of the vehicle into regenerative energy.

11. The secondary battery according to claim 1, wherein the negative electrode comprises a negative electrode active material comprising a titanium-containing oxide.

12. The secondary battery according to claim 1, wherein a pH of the first aqueous electrolyte is within a range of 10 to 14, and a pH of the second aqueous electrolyte is within a range of 2 to 7.

13. The secondary battery according to claim 1, wherein the second organic compound comprises at least one selected from the group consisting of acetone, 2-butanone, heptanone, cyclohexanone, formaldehyde, acetaldehyde, propanal, acetophenone, benzaldehyde, and derivatives thereof.

* * * * *